(12) United States Patent
Katsuki et al.

(10) Patent No.: US 10,924,718 B2
(45) Date of Patent: Feb. 16, 2021

(54) IMAGE PROCESSING DEVICE AND METHOD

(71) Applicant: SONY CORPORATION, Tokyo (JP)

(72) Inventors: Yugo Katsuki, Tokyo (JP); Naoki Kobayashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/611,040

(22) PCT Filed: May 25, 2018

(86) PCT No.: PCT/JP2018/020113
§ 371 (c)(1),
(2) Date: Nov. 5, 2019

(87) PCT Pub. No.: WO2018/225531
PCT Pub. Date: Dec. 13, 2018

(65) Prior Publication Data
US 2020/0128219 A1 Apr. 23, 2020

(30) Foreign Application Priority Data

Jun. 9, 2017 (JP) .................................. 2017-114258

(51) Int. Cl.
*H04N 9/31* (2006.01)
*G06T 7/521* (2017.01)
*G06T 7/37* (2017.01)

(52) U.S. Cl.
CPC .............. *H04N 9/3185* (2013.01); *G06T 7/37* (2017.01); *G06T 7/521* (2017.01); *G06T 2207/20221* (2013.01); *G06T 2207/20224* (2013.01)

(58) Field of Classification Search
CPC ............... H04N 9/3194; H04N 9/3185; H04N 5/23222; H04N 5/23238; H04N 5/23293; H04N 5/77; H04N 7/185; H04N 9/3147
See application file for complete search history.

(56) References Cited

U.S. PATENT DOCUMENTS

2007/0273795 A1* 11/2007 Jaynes ................. H04N 9/3147
348/745
2016/0295184 A1 10/2016 Ishikawa et al.

FOREIGN PATENT DOCUMENTS

EP 3086551 A2 10/2016
JP 2013-192098 A 9/2013
(Continued)

OTHER PUBLICATIONS

International Search Report and Written Opinion of PCT Application No. PCT/JP2018/020113, dated Aug. 7, 2018, 07 pages of ISRWO.

*Primary Examiner* — Samira Monshi
(74) *Attorney, Agent, or Firm* — Chip Law Group

(57) ABSTRACT

The present disclosure relates to an image processing device and method capable of suppressing a reduction in the accuracy of corresponding point detection. A homography transformation is applied to a captured pattern image obtained as a result of an imaging unit capturing an image of a predetermined structured light pattern projected by a projection unit, and using the captured pattern image with the homography transformation applied to detect corresponding points between the projected image projected by the projection unit and the captured image captured by the imaging unit. The present disclosure can be applied to, for example, an image processing device, an image projection device, a control device, an information processing device, a projection imaging system, an image processing method, a program, and the like.

19 Claims, 31 Drawing Sheets

(56) References Cited

FOREIGN PATENT DOCUMENTS

| | | | |
|---|---|---|---|
| JP | 2016-072591 | A | 5/2016 |
| JP | 2016-072691 | A | 5/2016 |
| JP | 2016-192710 | A | 11/2016 |
| JP | 2017-059903 | A | 3/2017 |

* cited by examiner

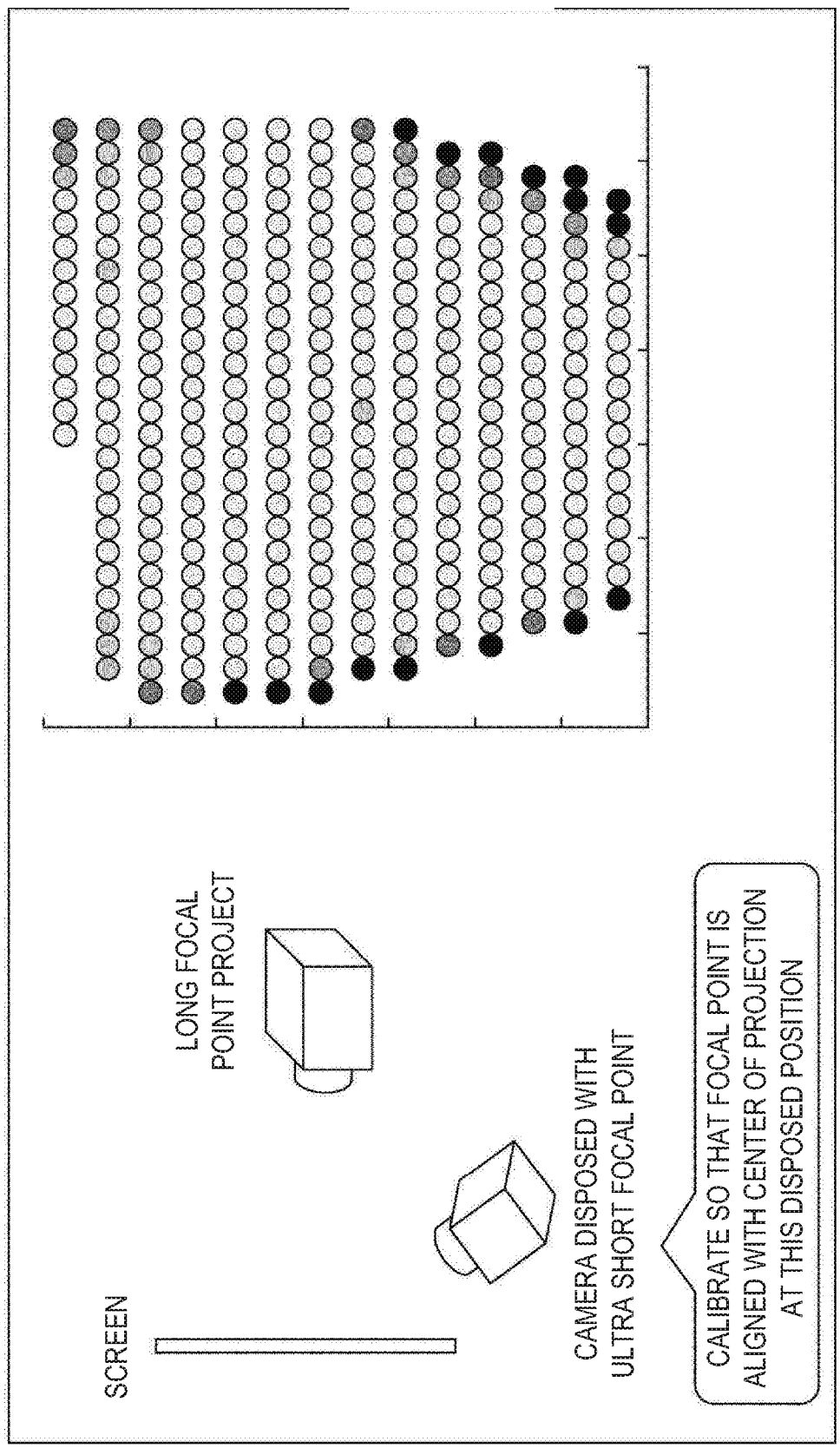

IMAGE PROCESSING DEVICE AND METHOD

CROSS REFERENCE TO RELATED APPLICATIONS

This application is a U.S. National Phase of International Patent Application No. PCT/JP2018/020113 filed on May 25, 2018, which claims priority benefit of Japanese Patent Application No. JP 2017-114258 filed in the Japan Patent Office on Jun. 9, 2017. Each of the above-referenced applications is hereby incorporated herein by reference in its entirety.

TECHNICAL FIELD

The present disclosure relates to an image processing device and method, and more particularly, to an image processing device and method capable of suppressing a reduction in the accuracy of corresponding point detection.

BACKGROUND ART

In the related art, to reduce distortion of a projected image projected by a projector and align each projected image from a plurality of projectors, there is a method of capturing a projected image with a camera and using the captured image to perform geometric correction of the projected image according to the position and attitude of the projector(s), the shape of the projection plane, and the like. In the case of such a method, it has been necessary to compute corresponding points between the projected image and the captured image.

For example, the imperceptible structured light (ISL) method, in which a pattern image is embedded into a content image to project, has been conceived as a technology that computes the corresponding points of a content image while projecting the content image, also referred to as online sensing (for example, see Patent Literature 1). With the ISL method, by embedding and projecting two pattern images having the same patterns and mutually opposing directions of brightness change into consecutive frames of the content image, imperceptibility of the patterns is achieved.

Meanwhile, in recent years, ultra short throw projectors capable of radiating a large projection even in the case of being installed at a position extremely close to the projection plane compared to an ordinary projector have been developed. In the case of performing distortion correction by the ISL method using such an ultra short throw projector, it is conceivable to incorporate a camera into the ultra short throw projector to make the work easier.

CITATION LIST

Patent Document

Patent Document 1: Japanese Patent Application Laid-Open No. 2013-192098

SUMMARY OF THE INVENTION

Problems to be Solved by the Invention

However, in such a case, the camera will capture an image of the projected image at an angle looking up from below near the projection plane for example, the pattern distortion in the captured image will increase and the like, and there is a concern that the accuracy of detecting corresponding points will be reduced.

The present disclosure has been devised in light of such circumstances, and is capable of suppressing a reduction in the accuracy of corresponding point detection.

Solutions to Problems

An image processing device according to an aspect of the present technology includes: a corresponding point detection unit that applies a homography transformation to a captured pattern image obtained as a result of an imaging unit capturing an image of a predetermined structured light pattern projected by a projection unit, and uses the captured pattern image with the homography transformation applied to detect corresponding points between the projected image projected by the projection unit and the captured image captured by the imaging unit.

An image processing method according to an aspect of the present technology includes: applying a homography transformation to a captured pattern image obtained as a result of an imaging unit capturing an image of a predetermined structured light pattern projected by a projection unit, and using the captured pattern image with the homography transformation applied to detect corresponding points between the projected image projected by the projection unit and the captured image captured by the imaging unit.

In the image processing device and the method according to an aspect of the present technology, a homography transformation is applied to a captured pattern image obtained as a result of an imaging unit capturing an image of a predetermined structured light pattern projected by a projection unit, and the captured pattern image with the nomography transformation applied is used to detect corresponding points between the projected image projected by the projection unit and the captured image captured by the imaging unit.

Effects of the Invention

According to the present disclosure, an image can be processed. Particularly, a reduction in the accuracy of corresponding point detection can be suppressed.

BRIEF DESCRIPTION OF DRAWINGS

FIG. 27 is a diagram illustrating an example of homography transformation error.

MODE FOR CARRYING OUT THE INVENTION

Hereinafter, embodiments for carrying out the present disclosure (hereinafter referred to as the embodiments) will be described. Note that the description will proceed in the following order.

1. ISL method and corresponding point detection
2. First embodiment (projection imaging system)
3. Second embodiment (projection imaging system/projection imaging device)
4. Other 1. ISL Method and Corresponding Point Detection <Corresponding point detection and geometric correction>

Figure 1B:
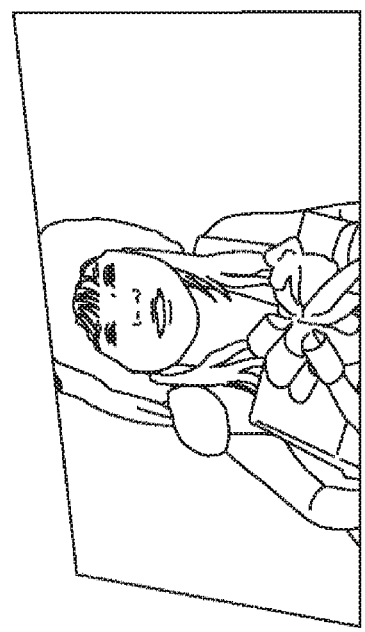
FIGS. 1A and 1B are diagrams illustrating an example of how geometric correction is performed.
Figure 1A:
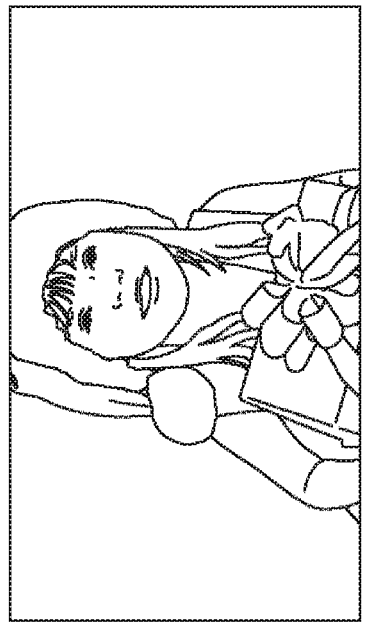

Depending on the attitude (such as the position and direction) with respect to the projection plane (such as a screen or a wall) of a projector, the shape of the projection plane, and the like, an image that is projected (also referred to as the projected image) may become distorted and difficult to see in some cases, like FIG. 1A for example. In such cases, by performing geometric correction such as distortion correction on the image projected by the projector, the projected image can be made less distorted and easier to see, like the example of FIG. 1B.

Figure 2B:
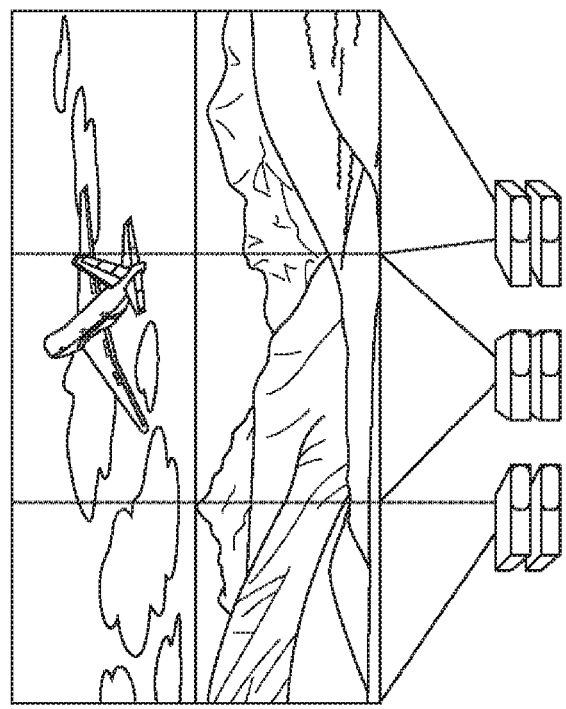
FIGS. 2A and 2B are diagrams illustrating an example of how geometric correction is performed.
Figure 2A:
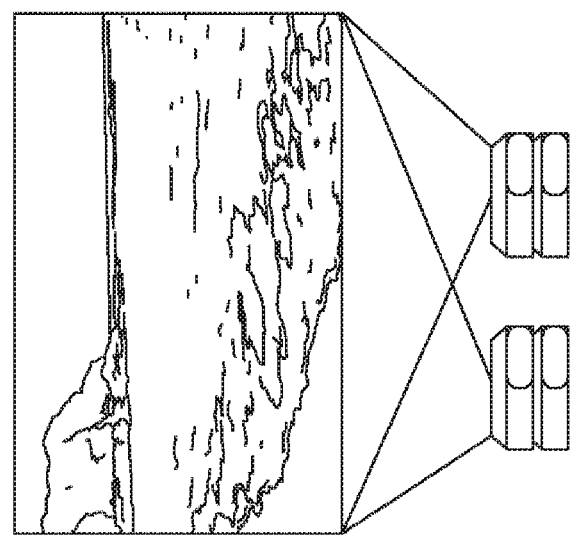

Also, like the example of FIGS. 2A and 2B, there is a system that projects images with a plurality of projectors and causes a single projected image to be formed. For example, there is a method of increasing the contrast ratio and achieving high dynamic range by projecting images onto the same position as each other from a plurality of projectors, like FIG. 2A. As another example, there is a method of achieving a projected image that is larger than the projected image projected by a single projector (a projected image of higher resolution than a projected image projected by a single projector) by arranging projected images respectively projected from a plurality of projectors, like FIG. 2B. In the case of these methods, if the positional relationships between the projected images projected from each projector are inappropriate, the projected images may become misaligned with each other and become superimposed onto each other, or unwanted gaps may be produced, and there is a concern that the image quality of the overall projected image will be reduced. For this reason, in some cases, it is necessary to perform not only the distortion correction described above on each projected image, but also geometric correction such as the alignment of the projected images with each other.

Figure 3:
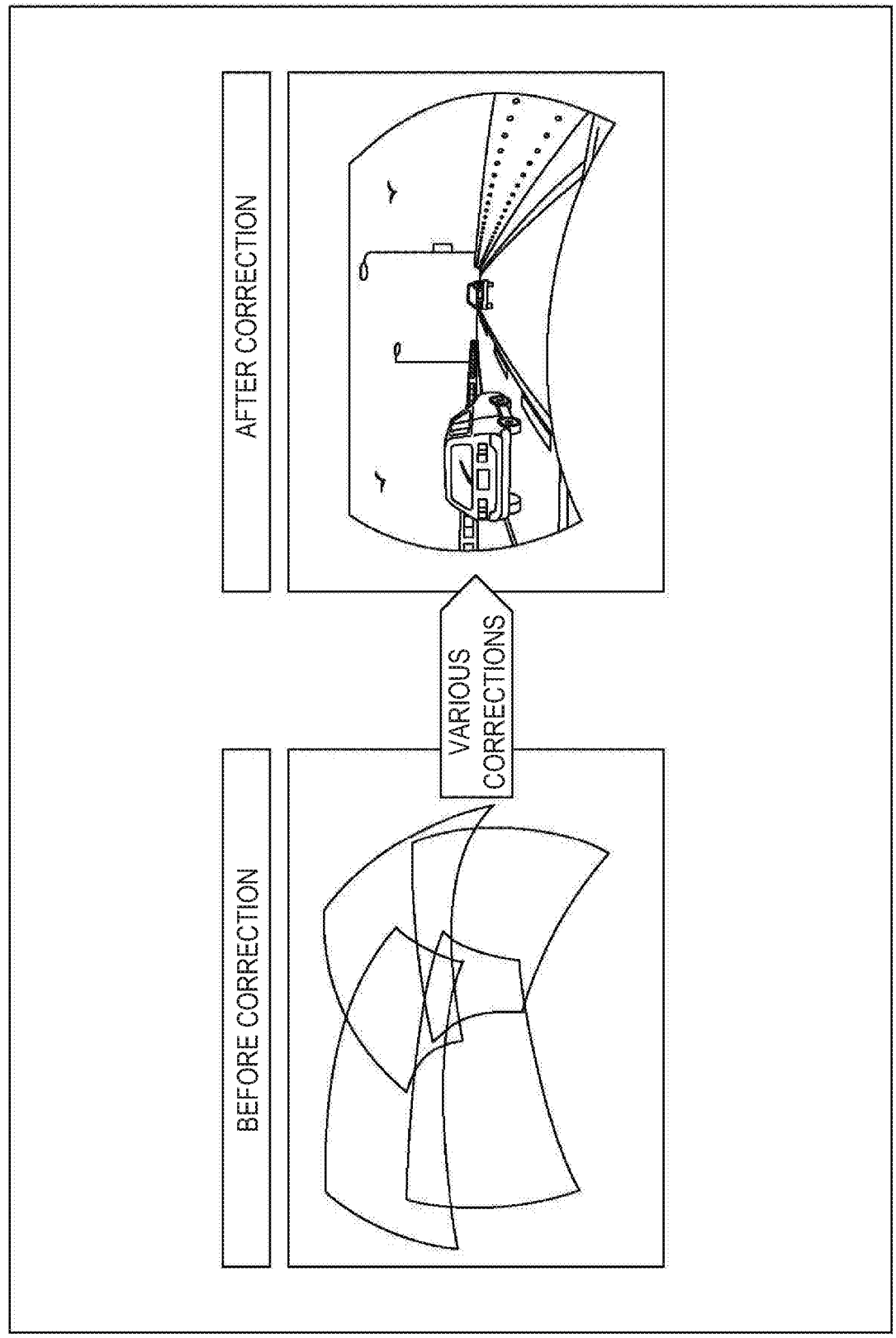
FIG. 3 is a diagram illustrating an example of how geometric correction is performed.

By performing geometric correction on the images to project in this way, the images can be projected to appear like a single image, even in the case of projecting images onto a curved projection plane from a plurality of projectors like the example in FIG. 3. Note that in the case of arranging a plurality of projected images to form a large projected image like the examples in FIG. 2B and in FIG. 3, alignment can be performed more easily by partially superimposing (overlapping) adjacent projected images with each other, like the example of FIG. 3.

Such geometric correction can also be performed manually by an operator or the like who operates the projectors, but there is a concern that troublesome work will be necessary. Accordingly, a method of using a camera to capture an image of the projected image projected by the projectors and using the captured image to perform geometric correction has been conceived.

Figure 4:
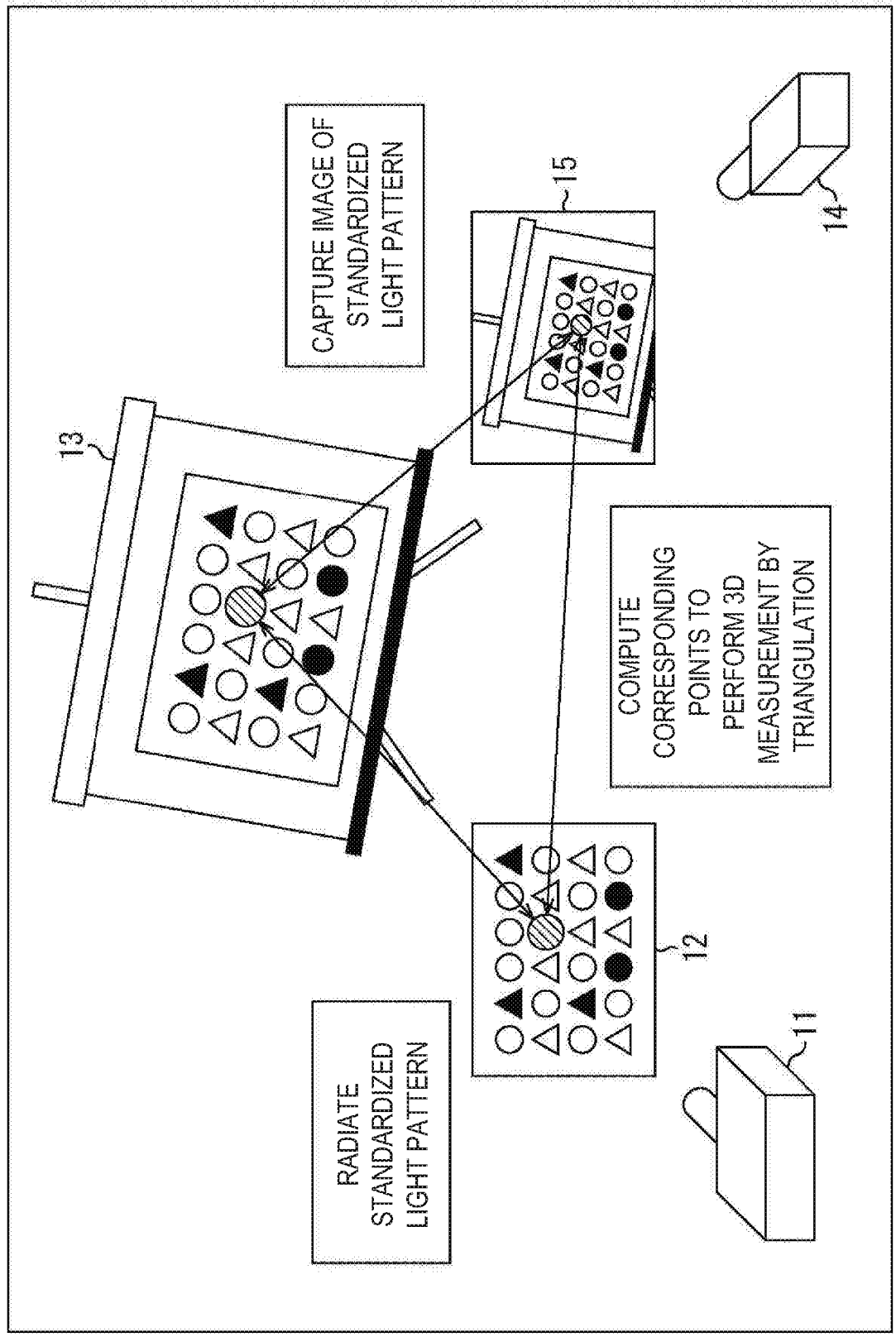
FIG. 4 is a diagram illustrating an example of how corresponding points are detected.

For example, like the example in FIG. 4, a standardized light pattern 12 of a predetermined design is projected from a projector 11 onto a screen 13, and the projected standardized light pattern 12 is imaged by a camera 14 to obtain a captured image 15. Subsequently, corresponding points between the standardized light pattern 12 and the captured image 15 are computed on the basis of the design of the standardized light pattern 12, the attitude (positional relationship) between the projector 11 and the camera 14, the shape of the screen 13, and the like are computed by triangulation or the like on the basis of the corresponding points, and geometric correction is performed on the basis of the result. By performing a process in this way, geometric correction can be performed more easily than in the manual case.

In the case of performing geometric correction using a camera in this way, it is necessary to compute corresponding points between the projected image (or the image to be projected) and the captured image (pixels in the projected image and the captured image that correspond to the same position as each other in the projection plane). In other words, it is necessary to compute correspondence relationships between the pixels of the camera 14 (captured image 15) and the pixels of the projector 11 (standardized light pattern 12).

Also, in the case of using a plurality of projectors like the examples in FIGS. 2A, 2B, and 3, it is also necessary to compute the positional relationships between each of the projected images with each other.

Figure 5:
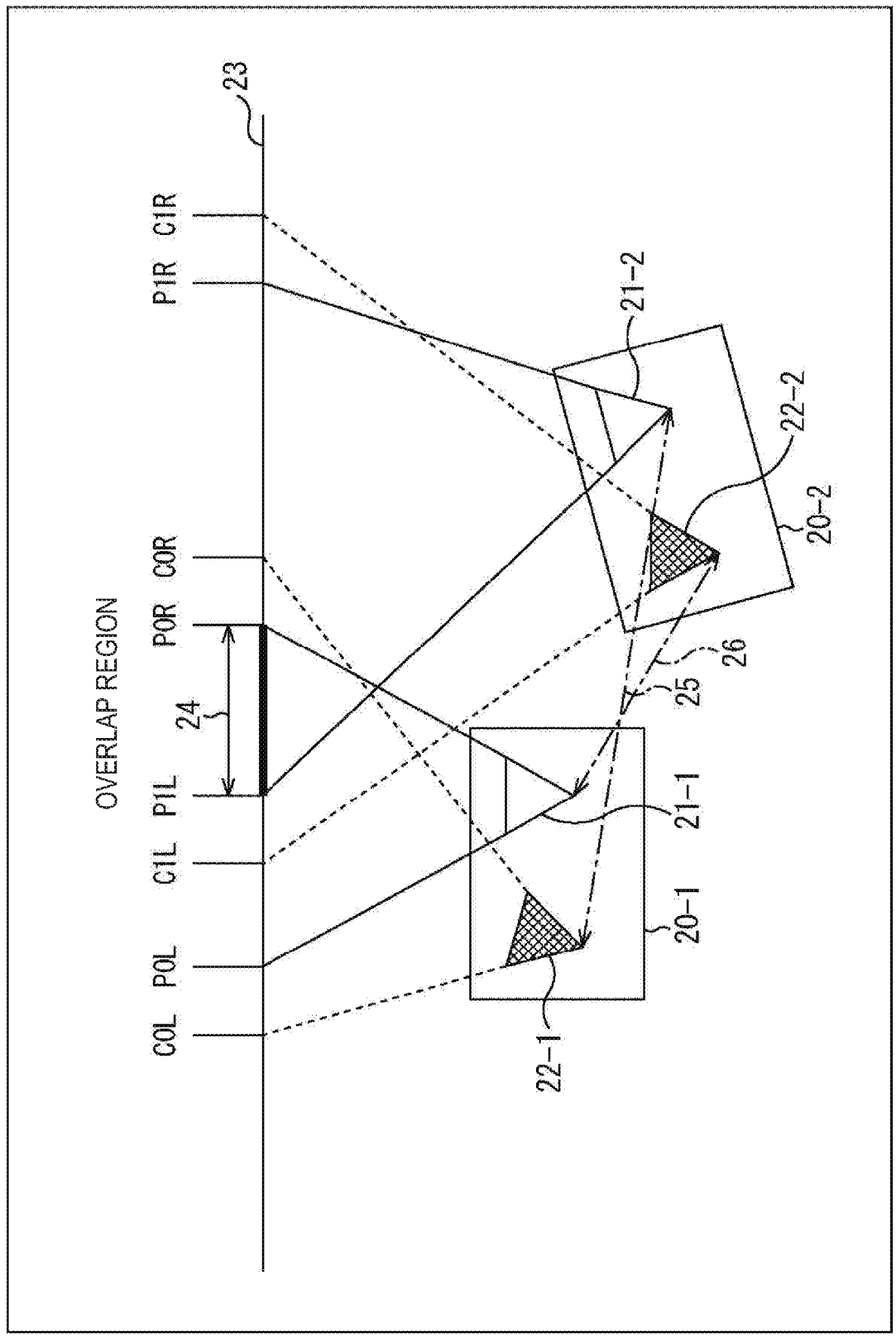
FIG. 5 is a diagram illustrating an example of how corresponding points are detected.

For example, like the example in FIG. 5, suppose that an image is to be projected by the cooperation between a projection imaging device 20-1 that includes a projection unit 21-1 (projector) and an imaging unit 22-1 (camera), and a projection imaging device 20-2 that includes a projection unit 21-2 (projector) and an imaging unit 22-2 (camera). Herein, the projection imaging device 20-1 and the projection imaging device 20-2 will be referred to as the projection imaging device(s) 20 in a case where it is not necessary to distinguish between the two in the description. Also, the projection unit 21-1 and the projection unit 21-2 will be referred to as the projection unit(s) 21 in a case where it is not necessary to distinguish between the two in the description. Furthermore, the imaging unit 22-1 and the imaging unit 22-2 will be referred to as the imaging unit(s) 22 in a case where it is not necessary to distinguish between the two in the description.

As illustrated in FIG. 5, a projection region (a range of a projected image) in a projection plane 23 by the projection unit 21-1 of the projection imaging device 20-1 is a range from POL to POR. Also, a projection region in the projection plane 23 by the projection unit 21-2 of the projection imaging device 20-2 is a range from P1L to P1R. In other words, the range indicated by the double-headed arrow 24 (the range from P1L to POR) becomes an overlap region where the projected images are superimposed onto each other.

Note that an imaging region (a range contained in a captured image) in the projection plane 23 by the imaging unit 22-1 of the projection imaging device 20-1 is a range from COL to COR. Also, an imaging region (a range contained in a captured image) in the projection plane 23 by the imaging unit 22-2 of the projection imaging device 20-2 is a range from C1L to C1R.

Figure 6:
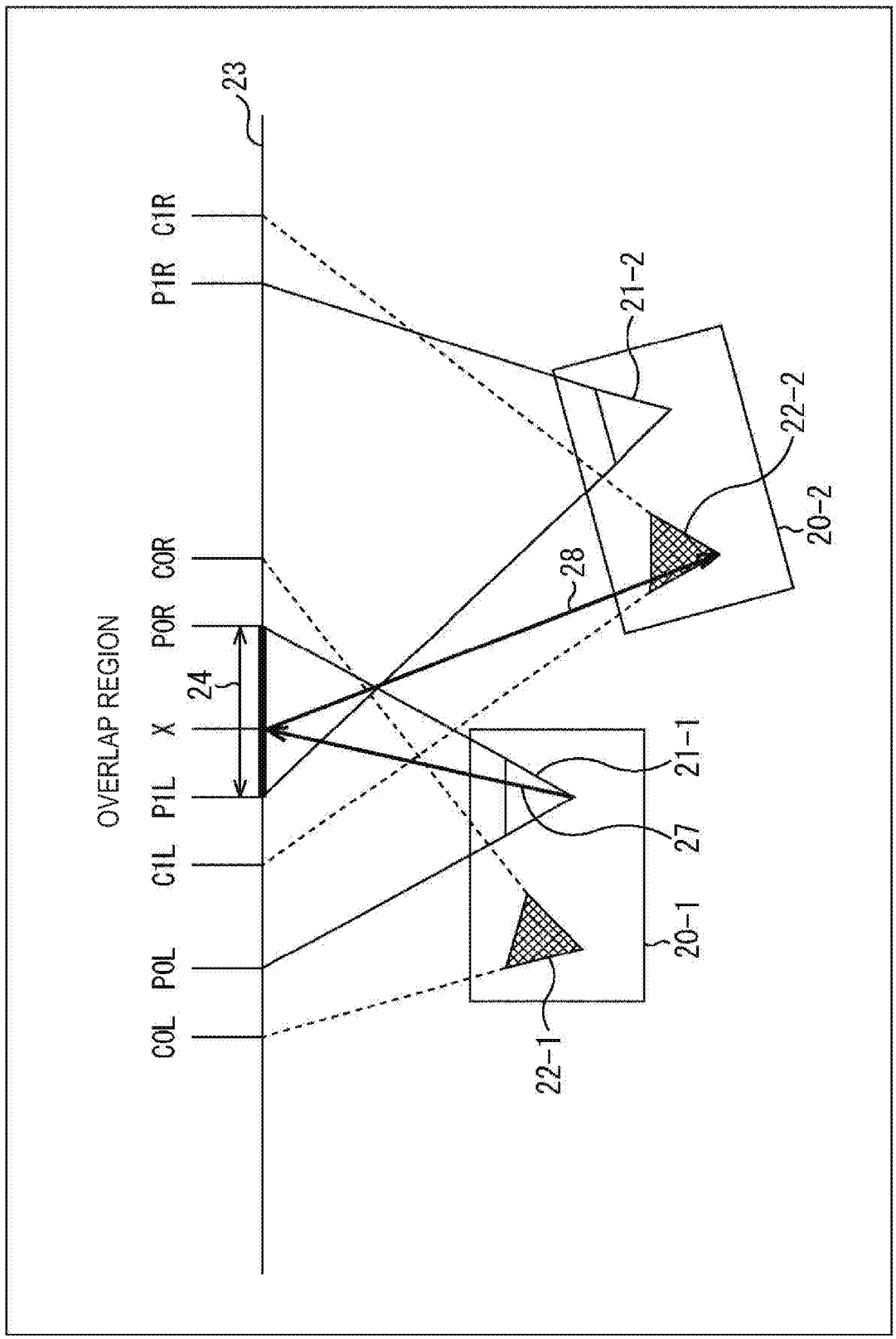
FIG. 6 is a diagram illustrating an example of how corresponding points are detected.

In the case of such a system, as described above, to align the projected images with each other, it is necessary not only to compute corresponding points between the projection unit 21 and the imaging unit 22 in each projection imaging device 20, but also to compute corresponding points between the projection unit 21 and the imaging unit 22 in different projection imaging devices 20. Accordingly, like in FIG. 6, for example, light (arrow 27) radiated from a certain pixel of the projection unit 21-1, reflected at X in the projection plane 23, and received (arrow 28) by which pixel of the imaging unit 22-2 is computed. Also, similar pixel correspondence relationships are also computed between the projection unit 21-2 and the imaging unit 22-1.

In this way, by computing corresponding points between all projection units 21 and imaging units 22 for which corresponding points can be computed, alignment of the overlap region (the range illustrated by the double-headed arrow 24) can be performed by geometric correction.

<Online Sensing>

Although it is conceivable to perform such corresponding point detection for the purpose of geometric correction before starting the projection of a visual image, there is a concern that the corresponding points will be displaced after the initial installation due to external disturbances and the like such as temperature and vibrations while the visual image is being projected. If the corresponding points become displaced, the geometric correction becomes inappropriate, and there is a concern that distortion and misalignment of the projected images will occur.

In such a case, it is necessary to re-detect the corresponding points, but interrupting the projection of the visual image for this purpose is undesirable for the user looking at the visual image (there is a concern of lowering user satisfaction). Accordingly, methods of detecting corresponding points while continuing to project a visual image (online sensing) have been conceived.

For example, a method of using invisible light such as infrared, a method of using image features such as SIFT, the imperceptible structured light (ISL) method, and the like have been conceived as online sensing technology. In the case of the method using invisible light such as infrared, because a projector that projects invisible light (for example, an infrared projector) is additionally necessary, there is a concern of increased costs. Also, in the case of using image features such as SIFT, because the detection accuracy and density of the corresponding points depends on the image content to project, it is difficult to perform corresponding point detection with stable accuracy.

In contrast, because the case of the ISL method uses visible light, increases in the structural elements of the system (that is, increases in costs) can be suppressed. Also, corresponding point detection can be performed with stable accuracy, without being dependent on the image to project.

<ISL Method>

The ISL method is a technology that positively and negatively inverts and embeds a predetermined pattern image, namely a structured light pattern, into the projection and projects the image such that the predetermined pattern image is not perceived by human beings.

Figure 7:
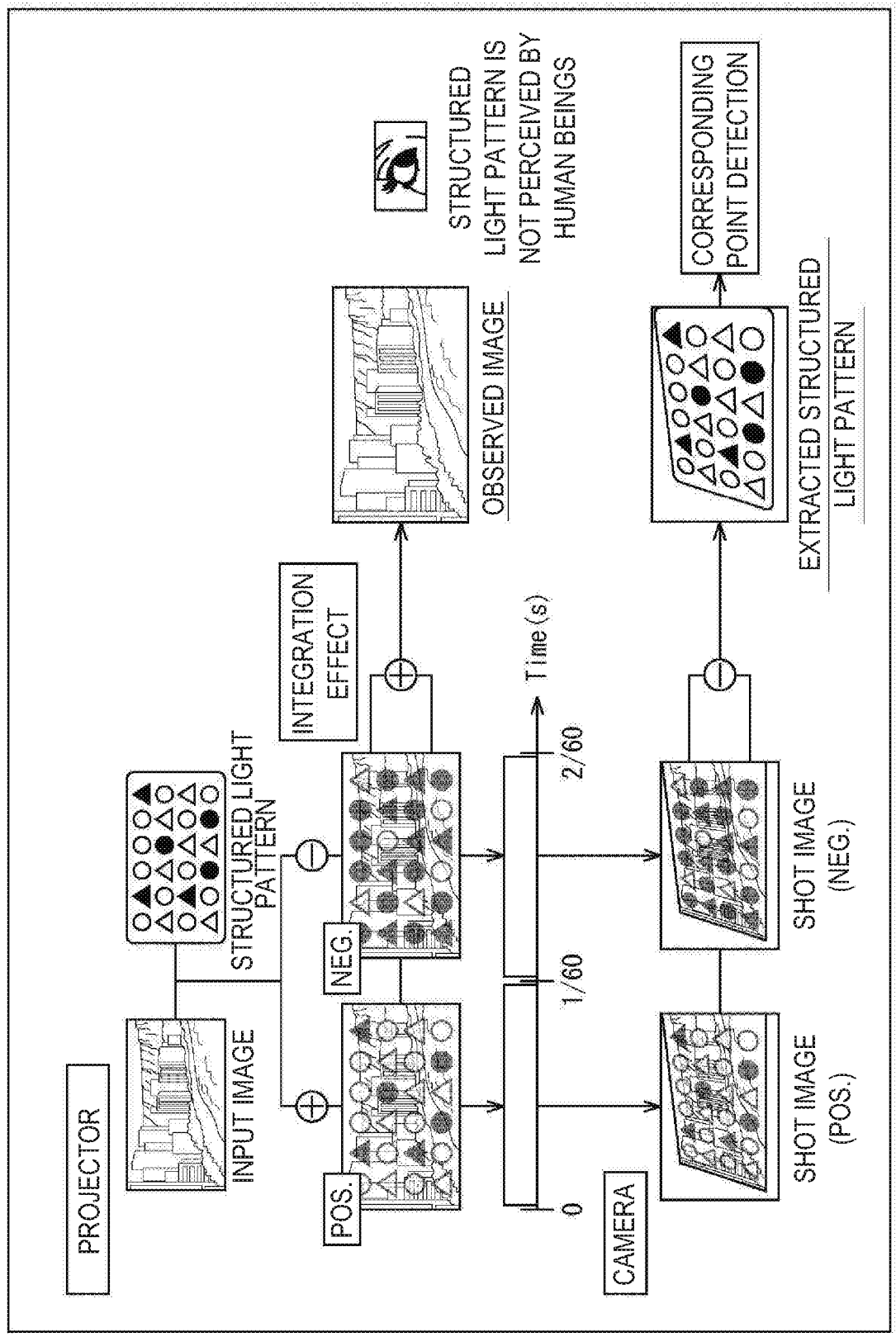
FIG. 7 is a diagram explaining an example of ISL.

As illustrated in FIG. 7, by adding predetermined structured light patterns to a certain frame of an input image, a projector generates a frame image in which a positive image of the structured light patterns is composited with the input image (content image), and by subtracting the structured light patterns from the next frame of the input image, the projector generates a frame image in which a negative image of the structured light patterns is composited with the input image. Subsequently, the projector consecutively projects these frames. The two positive and negative frames switched at high speed are combined and perceived as one in the human eye due to an integration effect. As a result, for the user looking at the projected image, it is difficult to recognize the structured light patterns embedded in the input image.

In contrast, a camera captures images of the projected images of these frames, and by computing the difference between the projected images of both frames, extracts only the structured light patterns contained in the captured images. The extracted structured light patterns are used to perform corresponding point detection.

In this way, with the ISL method, because structured light patterns can be extracted easily by simply computing the difference between captured images, ideally, corresponding point detection can be performed with stable accuracy, without being dependent on the image to project.

<Structure of Structured Light Patterns>

Figure 8:
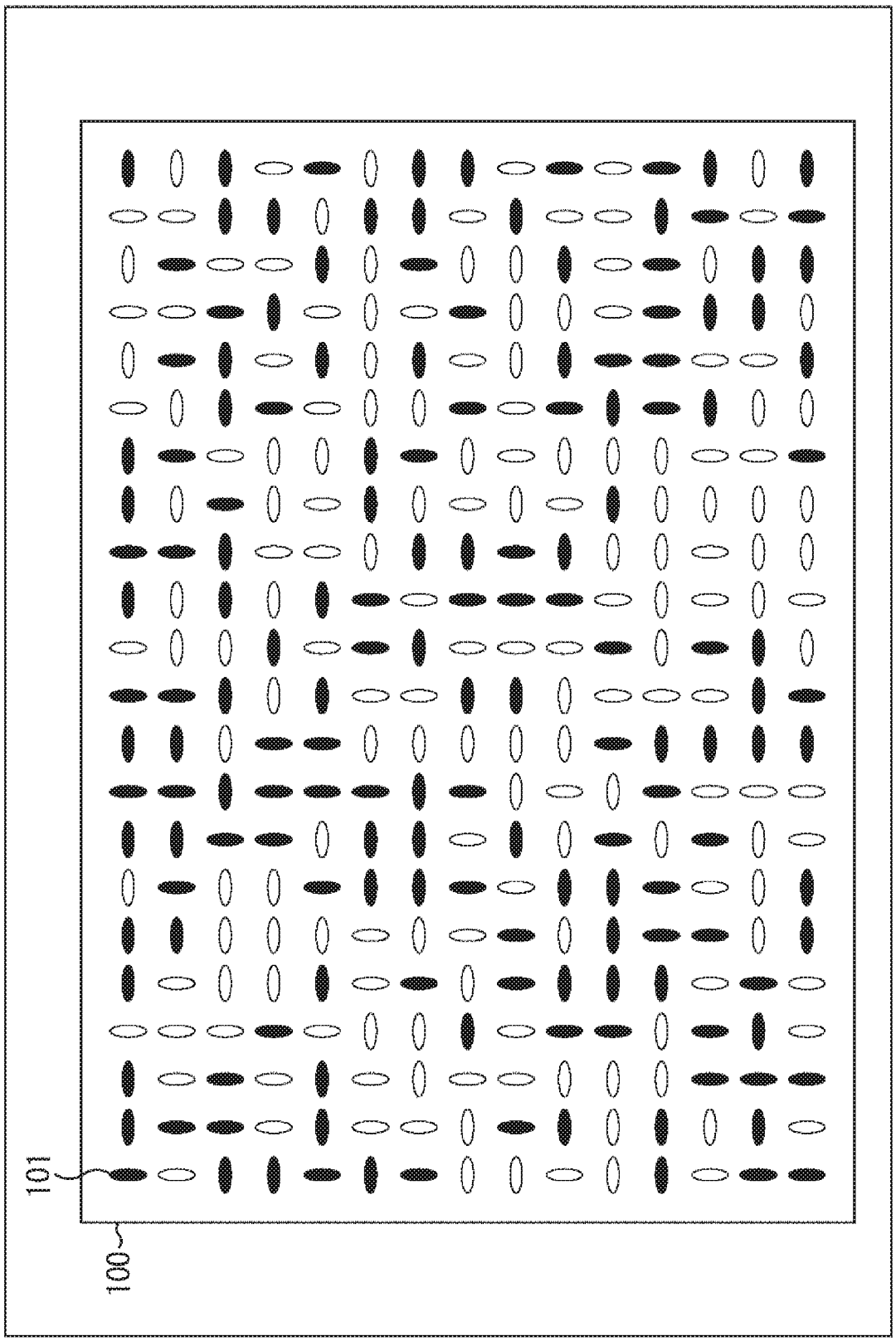
FIG. 8 is a diagram illustrating an example of structured light patterns.

A specific example of structured light patterns is illustrated in FIG. 8. A pattern image 100 illustrated in FIG. 8 is structured light patterns of the ISL method projected superimposed onto a content image. The pattern image 100 is for detecting corresponding points between a projected image projected by a projection unit and a captured image captured by an imaging unit (that is, pixel correspondence relationships between the projection unit and the imaging unit), and as illustrated in FIG. 8, includes a plurality of elliptical brightness distribution patterns 101 having different brightness values from the surroundings. In other words, in the pattern image 100, a plurality of patterns 101 having different brightness values from the surroundings is arranged (formed).

In FIG. 8, the white ellipse patterns 101 illustrate an example of a pattern in which the direction of brightness change is a positive direction, while the black ellipse patterns 101 illustrate an example of a pattern in which the direction of brightness change is a negative direction. Each pattern 101 may be of any size, and the patterns 101 may be the same size as each other or the patterns 101 having different sizes may be included. Also, the patterns 101 may have the same brightness distribution as each other or the patterns 101 having different brightness distributions may be included.

Figure 9:
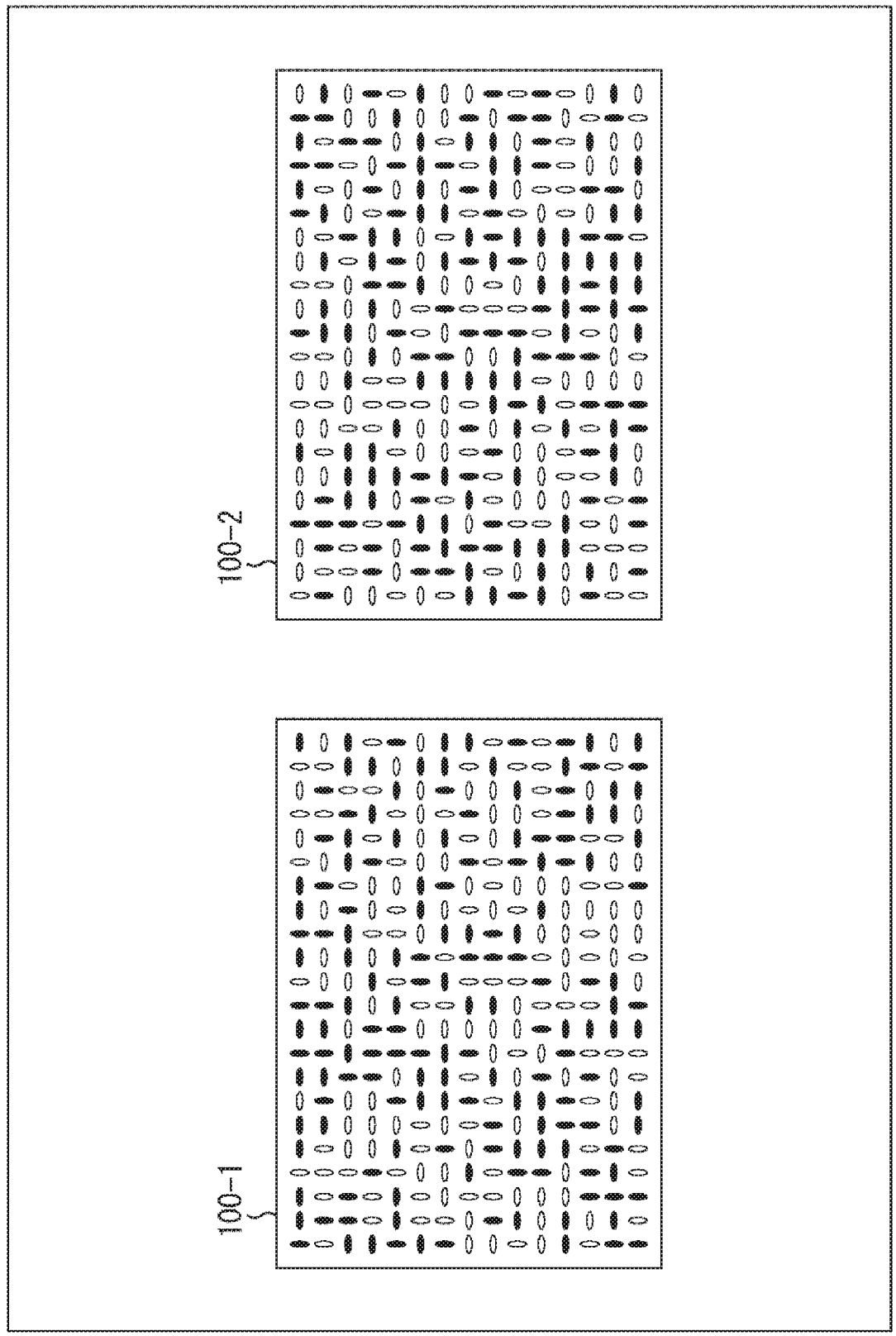
FIG. 9 is a diagram illustrating an example a positive image and a negative image of structured light patterns.

In the case of the ISL method, the pattern image 100 with such a configuration is projected superimposed onto another image (for example, a content image). At this time, similarly to the case described with reference to FIG. 7, the brightness values of the pattern image 100 are added to a certain frame of the content image and projected, while the brightness values of the pattern image 100 are subtracted from the next frame and projected. In other words, the pattern image 100 is superimposed onto the content image as a positive image 100-1 and a negative image 100-2 as illustrated in FIG. 9. The negative image 100-2 is an image obtained by inverting the sign of the brightness values in the positive image 100-1. In other words, the positive image 100-1 and the negative image 100-2 have the same pattern shape as each other and also have mutually opposing directions of brightness change.

By projecting such a positive image 100-1 and a negative image 100-2 so as to be superimposed onto two consecutive frames, the pattern image 100 can be made less perceptible by the user looking at the projected image due to an integration effect (it is possible to contribute to the invisibility of the pattern image 100).

<Ultra Short Throw Projector>

Figure 10:
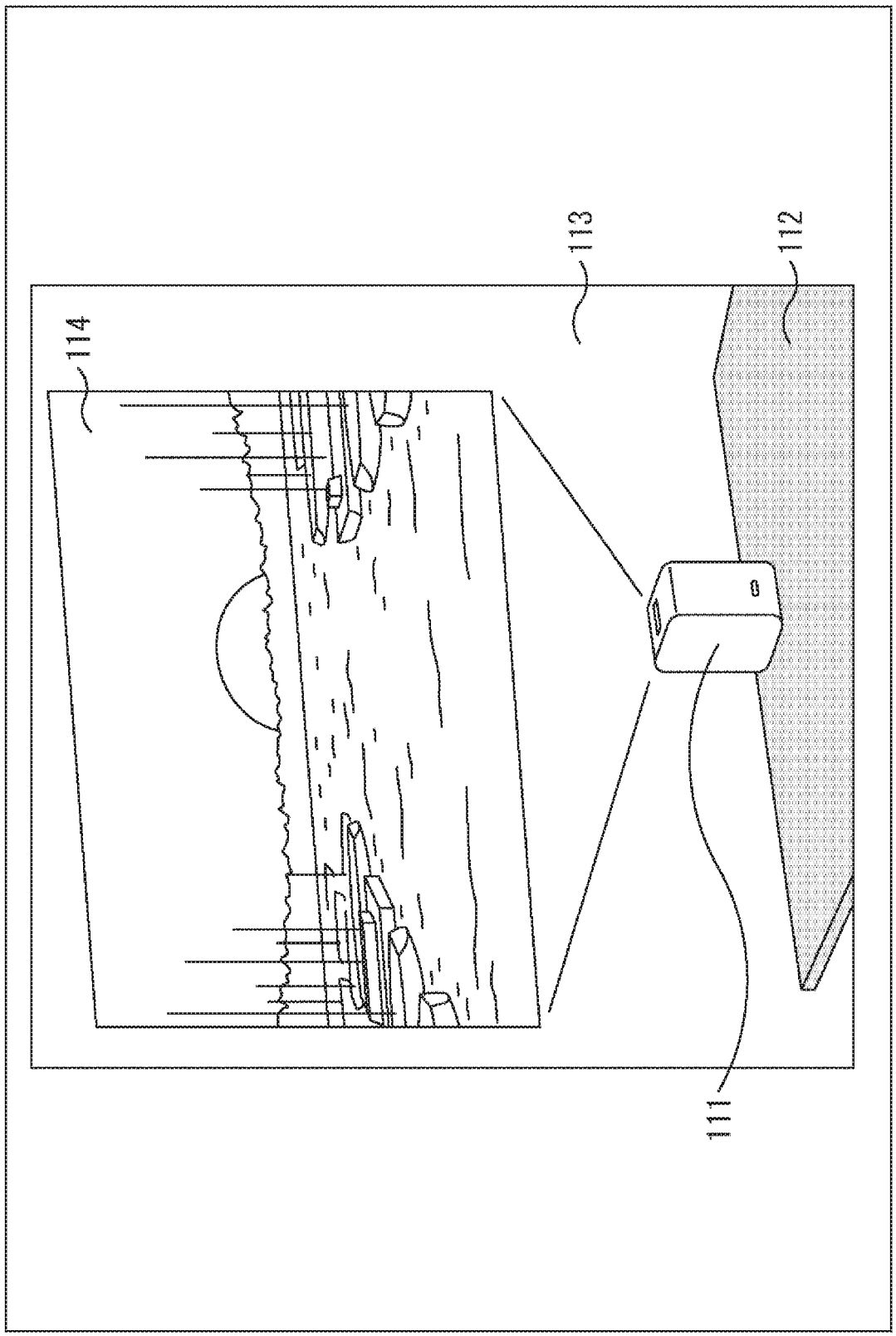
FIG. 10 is a diagram illustrating an example of how an image is projected by an ultra short throw projector.

Meanwhile, there are ultra short throw projectors capable of radiating a large projection even in the case of being installed at a position extremely close to the projection plane compared to an ordinary projector. For example, as illustrated in FIG. 10, an ultra short throw projector 111 is installed near a wall 113, such as on top of a table 112, and projects an image (a projected image 114) onto the wall 113. In other words, the ultra short throw projector 111 performs image projection from near the projection plane, as though looking up at the projected image 114 from below for example.

Also, if it is assumed that the projector and the camera required for the ISL method described above are formed as separate devices and each is installable at any position, it is necessary to compute the relative positions of these devices to perform triangulation correctly in the corresponding point detection (distortion correction). By providing (integrating) the projector and the camera in a single housing, the relative positions of these devices can be treated as known information (the work of computing the relative positions becomes unnecessary), and therefore the corresponding point detection (distortion correction) can be made easier (simplified).

Figure 11B:
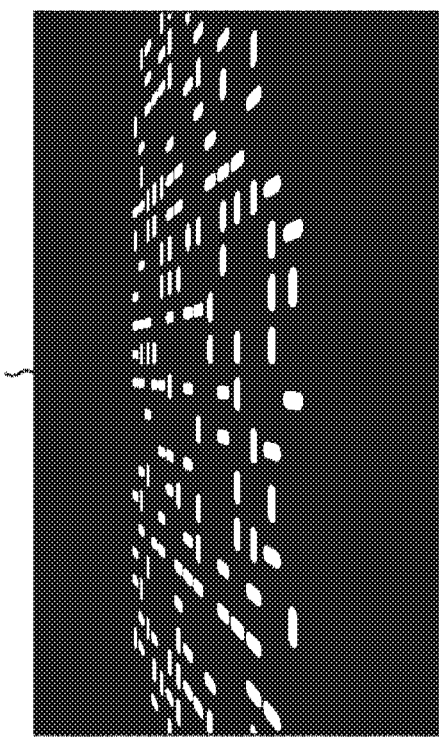
FIGS. 11A and 11B are diagrams illustrating an example of a captured pattern image.
Figure 11A:
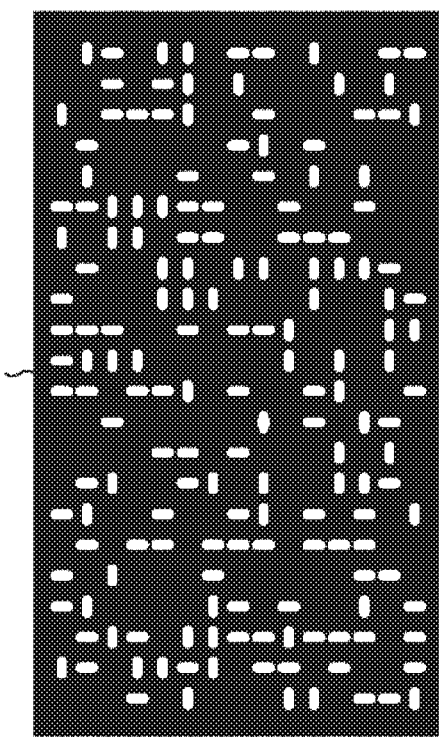

However, if a camera is incorporated into the ultra short throw projector 111, the camera will capture an image of the projected image at an angle looking up from below near the projection plane for example, pattern distortion in the captured image will increase, and there is a concern that the accuracy of detecting corresponding points will be reduced. For example, a captured pattern image 121 in FIG. 11A is a captured image of a pattern image obtained by capturing an image of the projected image from the front. When an image of this pattern image is captured by looking up from below the projected image near the projection plane, the captured pattern image becomes like the example illustrated in FIG. 11B. As illustrated in FIG. 11B, in a captured pattern image 122 in this case, the patterns are greatly distorted, for example, and depending on the position, the number of pixels per pattern is greatly reduced. For this reason, there is a concern of reduced accuracy in corresponding point detection.

<Application of Homography Transformation to Pattern Image>

Accordingly, a homography transformation is applied to the captured pattern image obtained as a result of the imaging unit capturing an image of a predetermined structured light pattern projected by the projection unit, and by using the captured pattern image with the homography transformation applied, corresponding points between the projected image projected by the projection unit and the captured image captured by the imaging unit are detected.

For example, the plane in which the patterns are arranged in the detected captured pattern image 122 as illustrated in FIG. 11B is projected onto the plane of the projection plane as seen from the front by using a homography transformation (projective transformation). By converting the patterns to the state of the projection plane as seen from the front in this way, pattern distortion, size changes, and the like can be suppressed (in other words, the patterns are brought closer to the shape of the patterns in the image to project). Consequently, by detecting corresponding points using the captured pattern image after the homography transformation, a reduction in the accuracy of corresponding point detection can be suppressed.

<System Homography Transformation>

As the homography transformation, a homography transformation based on known design information (design values) of the projection unit (for example, a projector) and the imaging unit (for example, a camera) may be applied, for example. Such a homography transformation based on design values is also referred to as a system homography transformation.

Figure 12:
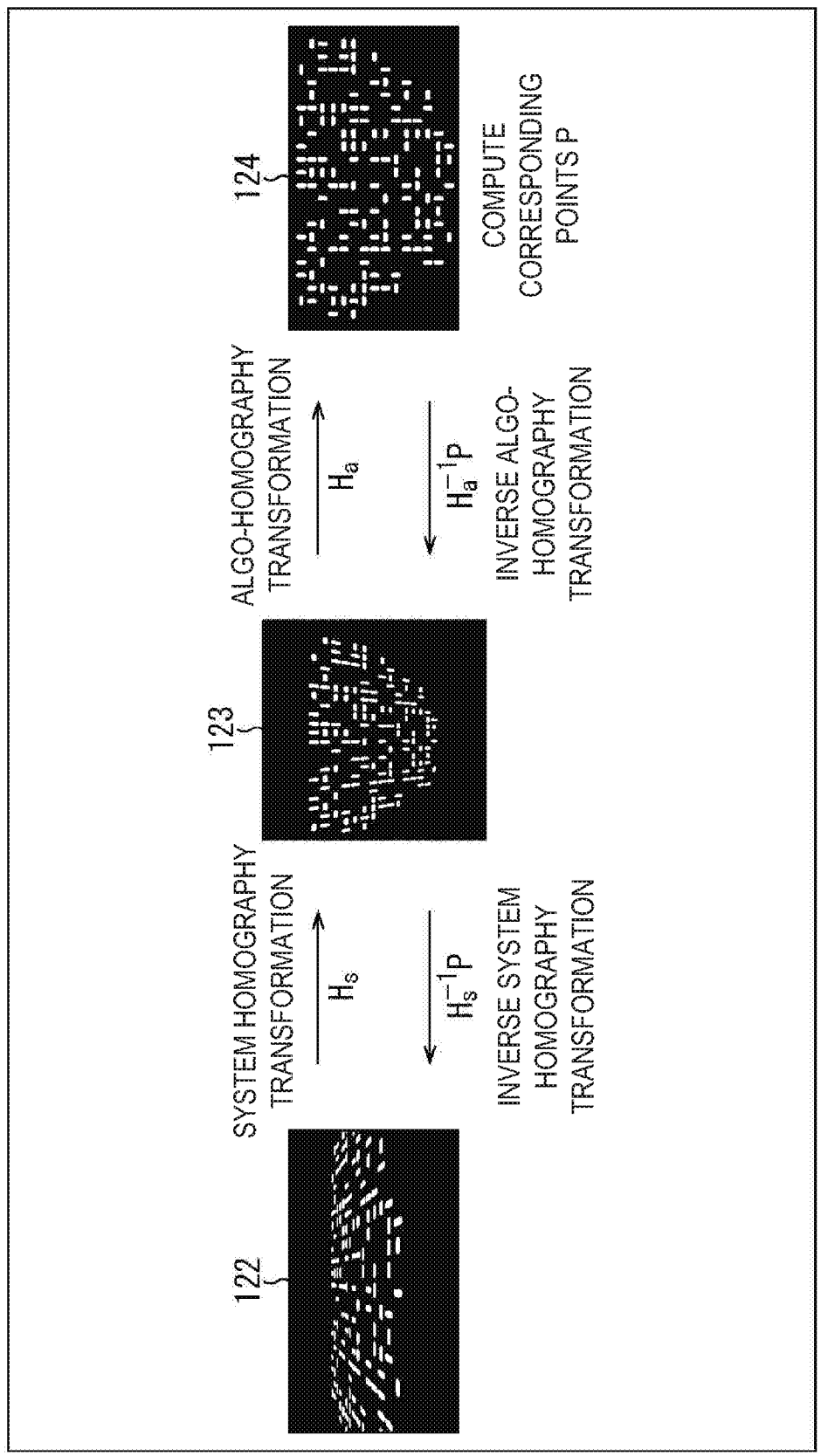
FIG. 12 is a diagram illustrating an example of how a homography transformation is performed.

For example, as illustrated in FIG. 12, (each coordinate of) a plane in which the patterns are arranged in the captured pattern image 122 in FIG. 11B is projected onto the plane (coordinate system) of the projection plane as seen from the front by using a system homography matrix Hs computed from design values. By applying the system homography transformation to the captured pattern image 122 in this way, a captured pattern image 123 is obtained. In other words, pattern distortion, size changes, and the like can be suppressed. Consequently, by detecting corresponding points using the captured pattern image 123 after the system homography transformation, a reduction in the accuracy of corresponding point detection can be suppressed.

Figure 13:
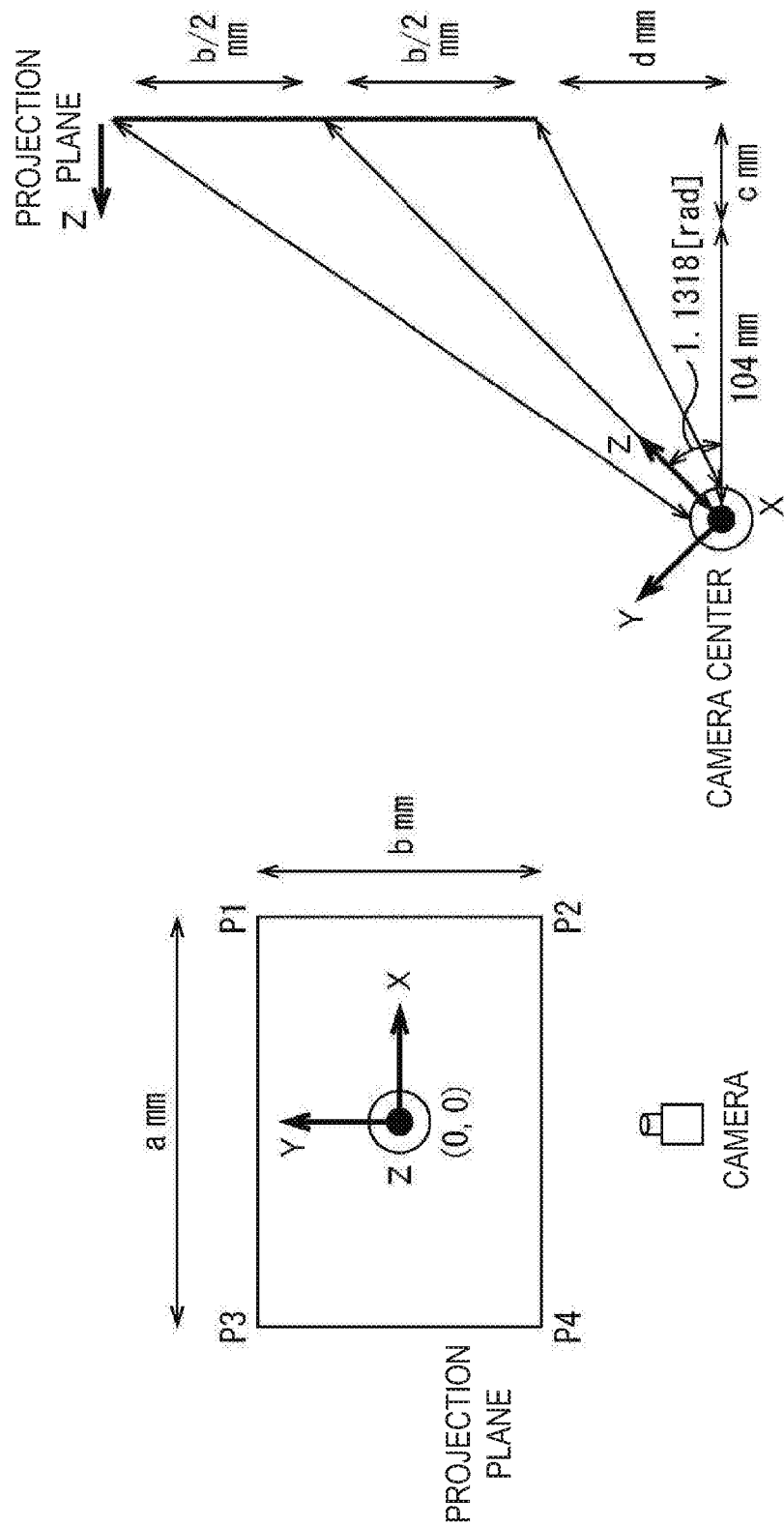
FIGS. 13A and 13B are diagrams illustrating an example of design values.

The system homography matrix Hs may be computed in any way, but may for example be computed using four corner points of the projected image. For example, world coordinates of four corner points (P1, P2, P3, and P4) of the projected image in the projection plane are computed. As illustrated in FIG. 13A for example, provided that the origin of the world coordinates is set to the center of the projection, the size in the vertical direction is b (mm), and the x-coordinate as well as the y-coordinate are 1 (mm)=1, the world coordinates of the four corners of the projected image become P1 (a/2, b/2), P2 (a/2, −b/2), P3 (−a/2, −b/2), and P4 (−a/2, b/2).

Next, the world coordinates of the four corners (P1 to P4) are transformed to a camera coordinate system using internal parameters roughly known about the camera (imaging unit). In other words, which positions (coordinates) in the captured image the four corner points of the projected image projected onto the projection plane take (that is, the correspondence relationship between the projection plane and the captured image) are specified using information about the position, the image capture direction, the angle of view, and the like of the imaging unit, for example. As illustrated in FIG. 13B for example, if this information is known, such a correspondence relationship between the projection plane (world coordinates) and the captured image (camera coordinate system), that is, the system homography matrix Hs, can be computed easily.

In other words, by applying a system homography transformation as the homography transformation, a reduction in the accuracy of corresponding point detection can be suppressed more easily.

Note that to revert a corresponding point detected in the coordinate system after the homography transformation back to the original coordinate system (the coordinate system of the captured pattern image 122), it is sufficient to perform the inverse transformation of the homography transformation (also referred to as the inverse homography transformation) on the corresponding point. Consequently, for example, to revert a corresponding point detected in the coordinate system after the system homography transformation back to the original coordinate system, as illustrated in FIG. 12, it is sufficient to perform the inverse transformation $(Hs^{-1}P)$ of the system homography transformation described above (also referred to as the inverse system homography transformation) on an obtained corresponding point P. In other words, in this case, the inverse matrix $Hs^{-1}$ of the system homography matrix Hs is treated as the homography matrix.

However, the system homography transformation is derived on the basis of several constraints, such as that the projection unit (projector) and the projection plane are parallel and that the internal parameters of the imaging unit (camera) are known to some degree, and there is a possibility of error being introduced during actual operation.

<Algo-Homography Transformation>

Accordingly, as illustrated in FIG. 12, as the homography transformation described above, not only the system homography transformation, but in addition, a homography transformation to the coordinate system of the image which is projected by the projection unit and is based on information about corresponding points detected using the captured pattern image 123 after the system homography transformation may be applied to the captured pattern image 123. Such a homography transformation based on corresponding points is also referred to as an algo-homography transformation.

For example, as illustrated in FIG. 12, (each coordinate of) a plane in which the patterns are arranged in the captured pattern image 123 is projected onto the coordinate system (plane) of the image projected by the projection unit, using an algo-homography matrix Ha computed from corresponding points between the image projected by the projection unit and the captured image captured by the imaging unit, the corresponding points being computed using the captured pattern image 123. By additionally applying the algo-homography transformation to the captured pattern image 123 in this way, a captured pattern image 124 is obtained. In other words, pattern distortion, size changes, and the like can be further suppressed. Consequently, by detecting corresponding points using the captured pattern image 124 after the algo-homography transformation, a reduction in the accuracy of corresponding point detection can be further suppressed.

Note that to revert a corresponding point detected in the coordinate system after the algo-homography transformation back to the original coordinate system (the coordinate system of the captured pattern image 123), as illustrated in FIG. 12, it is sufficient to perform the inverse transformation $(Ha^{-1}P)$ of the algo-homography transformation described above (also referred to as the inverse algo-homography transformation) on the obtained corresponding point P. In other words, in this case, the inverse matrix $Ha^{-1}$ of the algo-homography matrix Ha is treated as the homography matrix. Note that by additionally applying the inverse system homography transformation, a corresponding point can be reverted back to the coordinate system of the captured pattern image 122.

2. First Embodiment

<Projection Imaging System>

Figure 14:
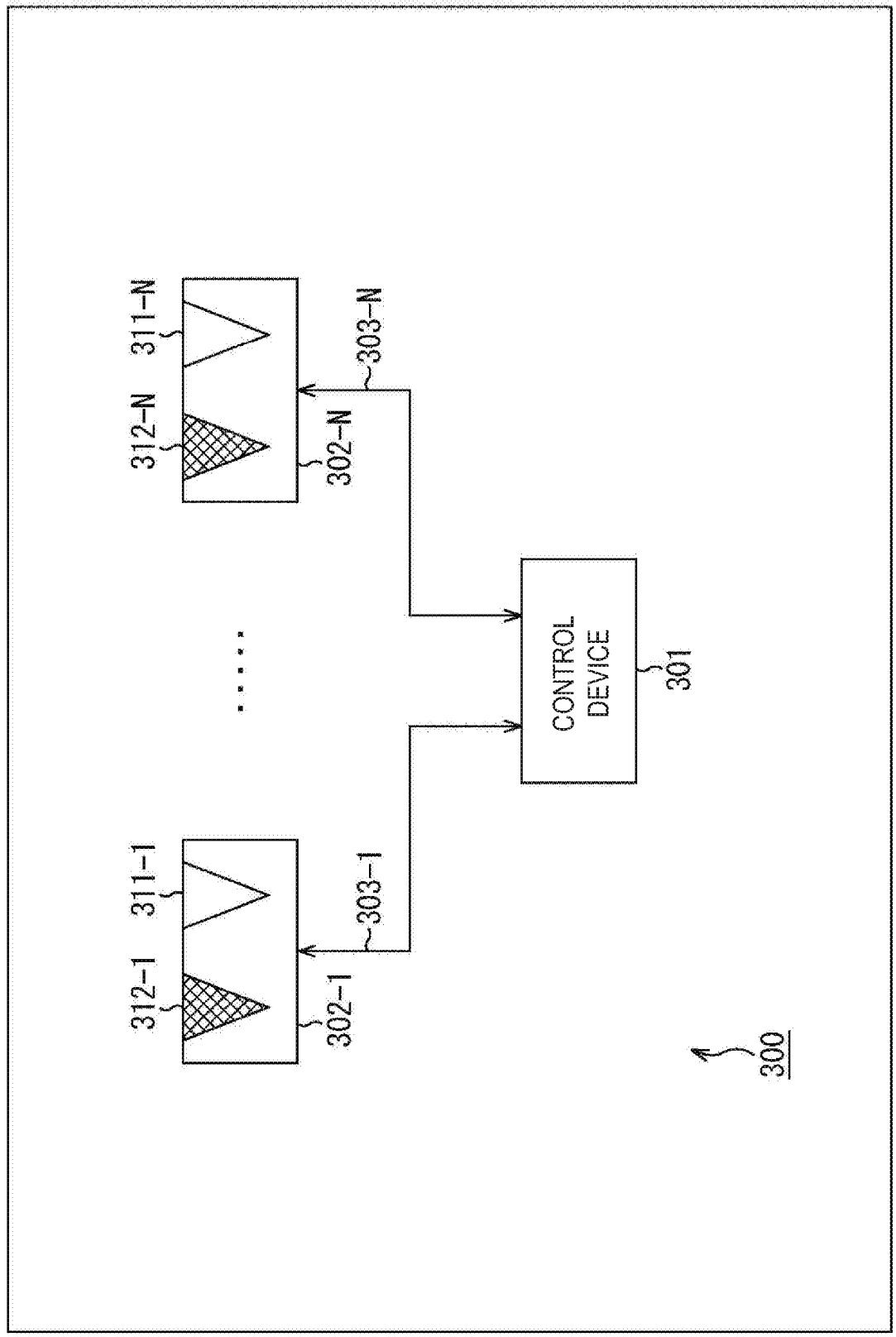
FIG. 14 is a block diagram illustrating an exemplary principal configuration of a projection imaging system.

Next, the detection of corresponding points using the pattern image 100 like the above will be described. FIG. 14 is a block diagram illustrating an exemplary principal configuration of one embodiment of a projection imaging system to which the present technology is applied. In FIG. 14, a projection imaging system 300 is a system capable of projecting an image, capturing an image of a projected image, and performing corresponding point detection by the ISL method according to the method to which the present technology described in <1. ISL method and corresponding point detection> is applied.

As illustrated in FIG. 14, the projection imaging system 300 includes a control device 301 and projection imaging devices 302-1 to 302-N (where N is any natural number). The projection imaging devices 302-1 to 302-N are connected to the control device 301 via cables 303-1 to 303-N, respectively.

In the following, the projection imaging devices 302-1 to 302-N will be referred to as the projection imaging device(s) 302 in a case where it is not necessary to distinguish among them in the description. Also, the cables 303-1 to 303-N will be referred to as the cable(s) 303 in a case where it is not necessary to distinguish among them in the description.

The control device 301 controls each projection imaging device 302 through the cable 303. For example, the control device 301 can supply an image to project and cause each projection imaging device 302 to project the image. As another example, the control device 301 can instruct each projection imaging device 302 to capture an image of the projected image or the like, and acquire the captured image. As yet another example, the control device 301 can detect corresponding points between the projected image and the captured image, and perform geometric correction on an image to be projected by each projection imaging device 302 on the basis of the computed corresponding points. Note that besides image processing performed on the image to be projected (such as enlargement, reduction, and deformation), the geometric correction can also include control and the like of an optical system of each projection imaging device 302 (such as controlling the projection direction, the image capture direction, and the like, for example).

The projection imaging devices 302-1 to 302-N respectively include projection units 311-1 to 311-N that project an image as well as imaging units 312-1 to 312-N that capture an image of a subject. In the following, the projection units 311-1 to 311-N will be referred to as the projection unit(s) 311 in a case where it is not necessary to distinguish among them in the description. Also, the imaging units 312-1 to 312-N will be referred to as the imaging unit(s) 312 in a case where it is not necessary to distinguish among them in the description.

The projection unit 311 has the functions of what is called a projector. In other words, the projection imaging device 302 can be driven as a projector using the projection unit 311. For example, the projection imaging device 302 can use the projection unit 311 to project an image supplied from the control device 301 onto any projection plane.

The imaging unit 312 has the functions of what is called a camera. In other words, the projection imaging device 302 can be driven as a camera using the imaging unit 312. For example, the projection imaging device 302 can use the imaging unit 312 to capture an image of a projection plane onto which an image is projected by the projection unit 311, and supply obtained data of the captured image to the control device 301.

In other words, the projection imaging device 302 has both the functions of what is called a projector and the functions of what is called a camera, and is capable of projecting an image onto a projection plane and capturing an image of the projection plane, for example. Additionally, as the function of a projector, the projection imaging device 302 has the function of what is called an ultra short throw projector, and is capable of radiating a large projection even in the case of being installed at a position extremely close to the projection plane compared to an ordinary projector. In other words, as illustrated in FIG. 10 for example, the projection imaging device 302 is installed near the wall 113 acting as the projection plane, and projects an image and captures an image of the projection plane from that position.

There may be any number of projection imaging devices 302, whether a single device or a plurality of devices. In a case where there is a plurality of projection imaging devices 302, under control by the control device 301, the projection imaging devices 302 can respectively cooperate with each other and project images as described with reference to FIGS. 2A, 2B, and 3. In other words, the projection imaging system 300 in this case is what is called a multi-projection system, and is capable of achieving what is called projection mapping.

Note that the projection direction and magnification of an image projected by the projection unit 311 as well as distortion correction and the like of the projected image may also be controllable. To achieve this control, for example, the position and attitude of an optical system included in the projection unit 311 or the entire projection unit 311 may be controllable.

In addition, the image capture direction and angle of view of an image captured by the imaging unit 312 as well as distortion correction and the like of the captured image may also be controllable. To achieve this control, for example, the position and attitude of an optical system included in the imaging unit 312 or the entire imaging unit 312 may be controllable.

Furthermore, such control of the projection unit 311 and control of the imaging unit 312 may be performed independently of each other. Also, the position and attitude of the projection imaging device 302 may be controllable. Note that such control of the projection unit 311, the imaging unit 312, and the projection imaging device 302 may be performed by the control device 301 or by something other than the control device 301.

The cable 303 is an electric communication cable of any communication standard by which a communication channel between the control device 301 and the projection imaging device 302 may be formed. Note that it is sufficient for the control device 301 and the projection imaging device 302 to be capable of communication with each other, and for example, the control device 301 and the projection imaging device 302 may also be connected by wireless communication. In this case, the cable 303 can be omitted.

In such a projection imaging system 300, to perform geometric correction of an image, the control device 301 performs corresponding point detection between each projection unit 311 and each imaging unit 312. For example, the control device 301 can perform corresponding point detection according to the online sensing ISL method. At that time, the control device 301 can perform corresponding point detection to which the present technology is applied.

<Control Device>

Figure 15:
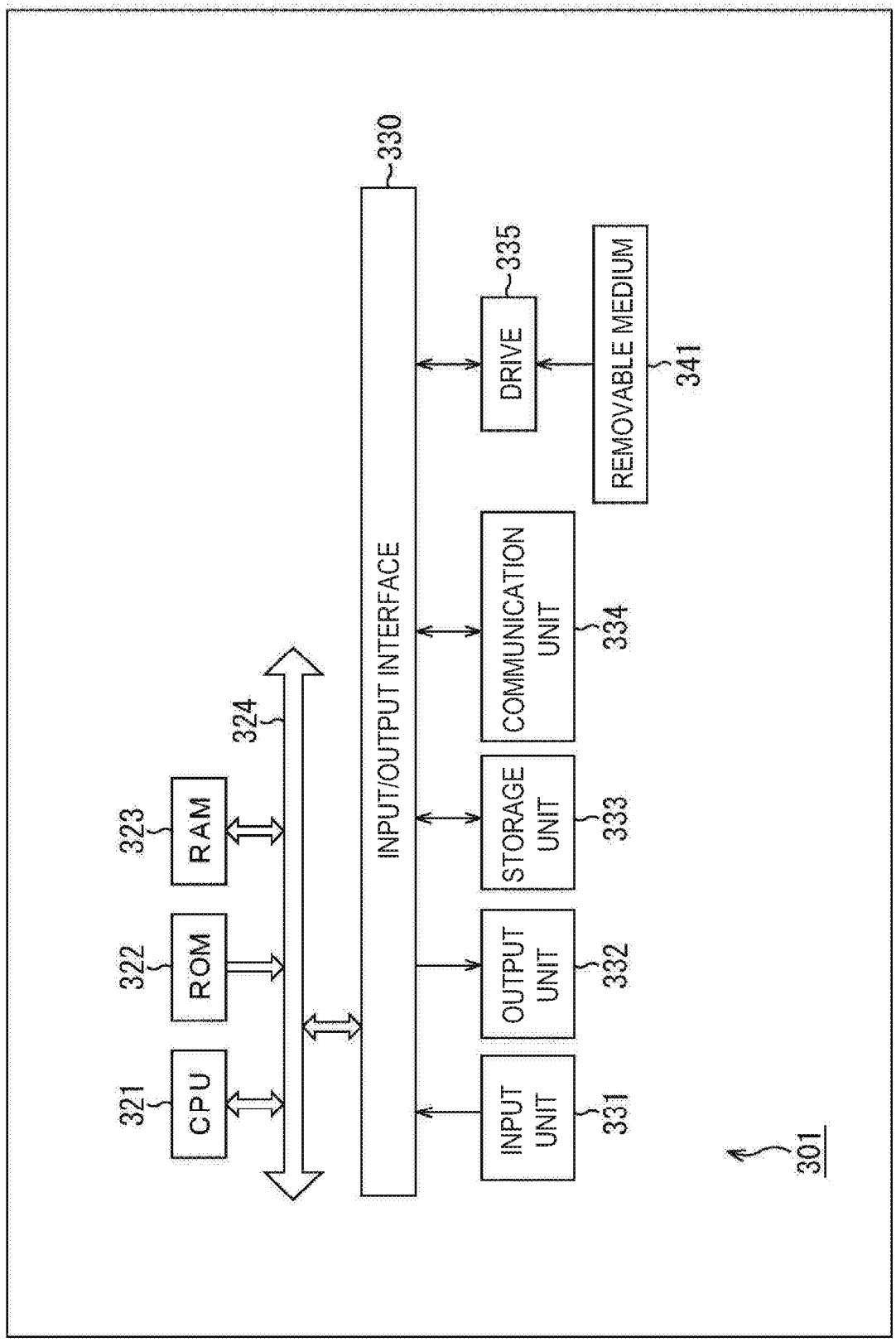
FIG. 15 is a block diagram illustrating an exemplary principal configuration of a control device.

FIG. 15 is a block diagram illustrating an exemplary principal configuration of the control device 301 that is one embodiment of an image processing device to which the present technology is applied.

As illustrated in FIG. 15, the control device 301 includes a central processing unit (CPU) 321, read-only memory (ROM) 322, random access memory (RAM) 323, a bus 324, an input/output interface 330, an input unit 331, an output unit 332, a storage unit 333, a communication unit 334, and a drive 335.

The CPU 321, the ROM 322, and the RAM 323 are interconnected by the bus 324. Additionally, the input/output interface 330 is also connected to the bus 324. The input unit 331, the output unit 332, the storage unit 333, the communication unit 334, and the drive 335 are connected to the input/output interface 330.

The input unit 331 includes input devices that receive external information such as user input. For example, the input unit 331 may include a keyboard, a mouse, an operation button, a touch panel, a camera, a microphone, an input terminal, and the like. Additionally, various sensors such as an acceleration sensor, an optical sensor, and a temperature sensor, and input devices such as a barcode reader may also be included in the input unit 331. The output unit 332 includes output devices that output information such as images and sound. For example, the output unit 332 may include a display, a speaker, an output terminal, and the like.

The storage unit 333 includes a storage medium that stores information such as programs and data. For example, the storage unit 333 may include a hard disk, a RAM disk, non-volatile memory, and the like. The communication unit 334 includes a communication device that communicates by exchanging information such as programs and data with an external device via a predetermined communication medium (any network such as the Internet for example). The communication unit 334 may include a network interface, for example. For example, the communication unit 334 communicates (exchanges programs and data) with a device external to the control device 301. Note that the communication unit 334 may have wired communication functions, wireless communication functions, or both.

The drive 335 reads out information (such as programs and data) stored in a removable medium 341 loaded into the drive 335 itself, such as a magnetic disk, an optical disc, a magneto-optical disc, or semiconductor memory, for example. The drive 335 supplies information read out from the removable medium 341 to the CPU 321, the RAM 323, and the like. Also, in a case where a writable removable medium 341 is loaded into the drive 335 itself, the drive 335 is capable of causing information (such as programs and data) supplied from the CPU 321, the RAM 323, and the like to be stored in the removable medium 341.

For example, the CPU 321 performs various processes by loading a program stored in the storage unit 333 into the RAM 323 through the input/output interface 330 and the bus 324, and executing the program. The RAM 323 also stores data necessary for the CPU 321 to execute various processes and the like as appropriate.

By executing a program or the like in this way, the CPU 321 can perform processes related to the detection of corresponding points, such as processes like those described in <1. ISL method and corresponding point detection>, for example.

<Functional Blocks of Control Device>

Figure 16:
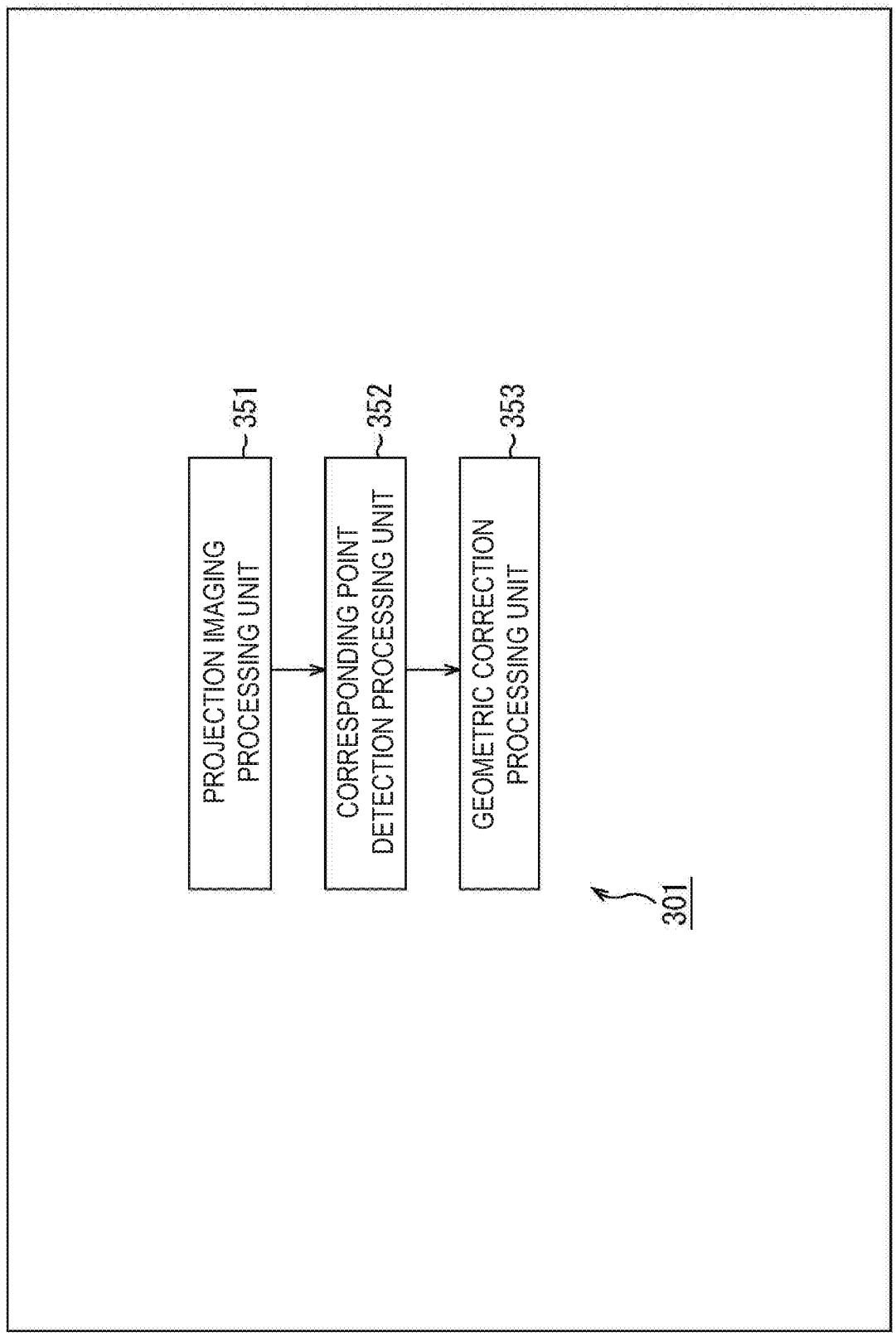
FIG. 16 is a function block diagram illustrating exemplary functions realized by the control device.

FIG. 16 is a function block diagram illustrating an example of functions realized by the control device 301 executing a program or the like. As illustrated in FIG. 16, by executing a program, the control device 301 functions as a projection imaging processing unit 351, a corresponding point detection processing unit 352, and a geometric correction processing unit 353, for example.

The projection imaging processing unit 351 performs processes related to image projection and image capture. For example, the projection imaging processing unit 351 performs image processing and the like on an image to be projected by the projection unit 311. Also, the projection imaging processing unit 351 controls the projection unit 311 to perform processes related to the control of image projection. Furthermore, the projection imaging processing unit 351 controls the imaging unit 312 to perform processes related to the control of image capture.

More specifically, for example, the projection imaging processing unit 351 composites a pattern image and a content image, controls the projection of the composite image, controls the image capture of the projected image, and the like as described in <ISL method> and the like of <1. ISL method and corresponding point detection>. Obviously, the projection imaging processing unit 351 may perform any process and is not limited to the above processes.

The corresponding point detection processing unit 352 performs processes related to the detection of corresponding points based on a captured image captured under control by the projection imaging processing unit 351. For example, the corresponding point detection processing unit 352 performs processes like those described in <ISL method>, <Application of homography transformation to pattern image>, <System homography transformation>, <Algo-homography transformation>, and the like of <1. ISL method and corresponding point detection>.

More specifically, for example, the corresponding point detection processing unit 352 performs processes such as generating a pattern difference image from a captured pattern image having a composition like that of the captured pattern image 122 (FIG. 12), the system homography transformation, the algo-homography transformation, corresponding point detection, and the inverse homography transformation. Obviously, the corresponding point detection processing unit 352 may perform any process and is not limited to the above processes.

The geometric correction processing unit 353 performs processes related to the geometric correction of an image to project. For example, the geometric correction processing unit 353 performs processes such as attitude estimation of the projection unit and the like, reconfiguration of the screen (projection plane), and geometric correction of the image to project, on the basis of corresponding points detected by the corresponding point detection processing unit 352. Obviously, the geometric correction processing unit 353 may perform any process and is not limited to the above processes.

Note that the blocks are capable of exchanging information (such as commands and data, for example) with each other as necessary.

<Projection Imaging Processing Unit>

Figure 17:
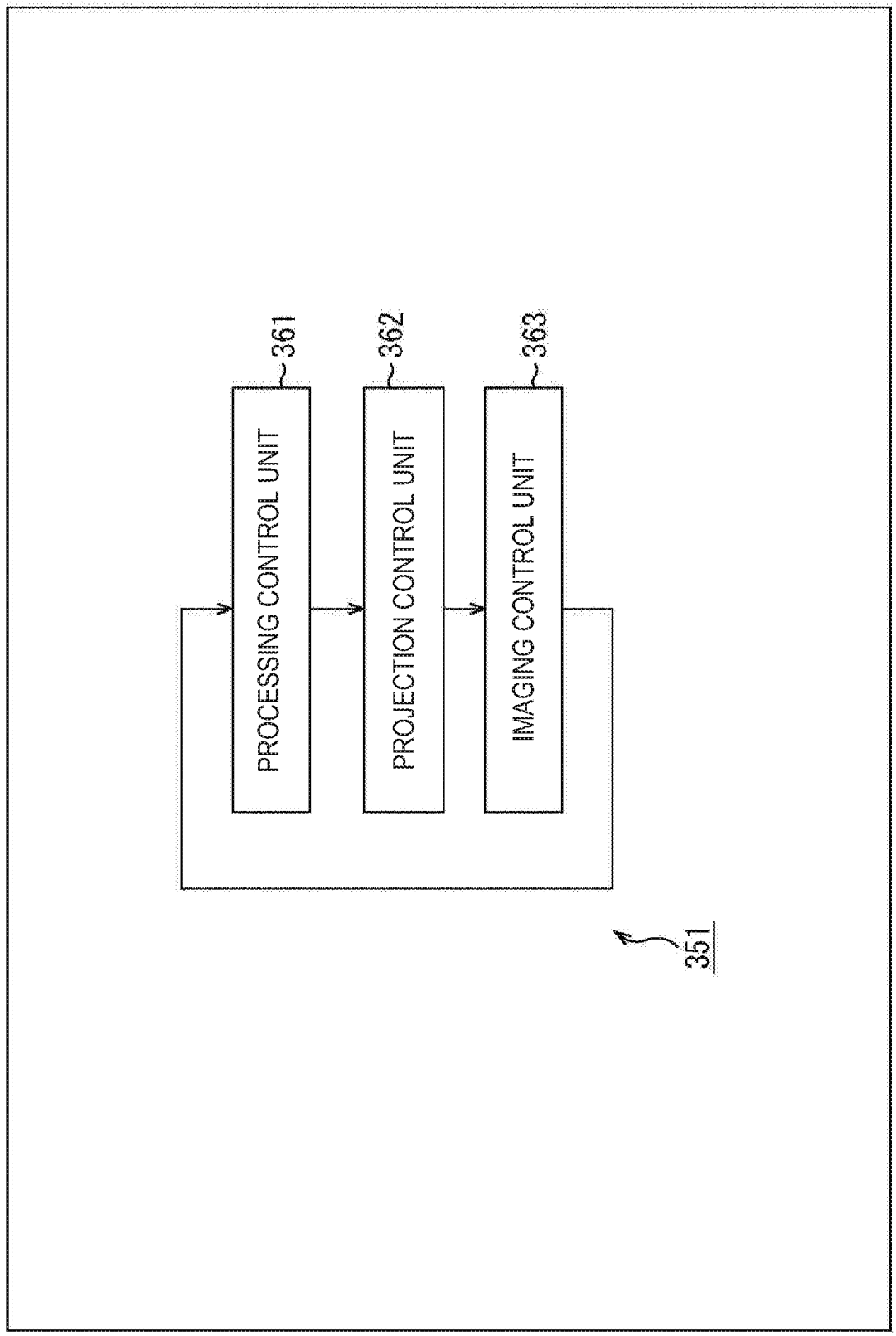
FIG. 17 is a function block diagram illustrating exemplary functions realized by a projection imaging processing unit.

An example of the functions included in the projection imaging processing unit 351 is illustrated in FIG. 17. In FIG. 17, the projection imaging processing unit 351 includes functions illustrated by function blocks such as a processing control unit 361, a projection control unit 362, and an imaging control unit 363, for example.

The processing control unit 361 performs processes related to the control of the projection imaging process. For example, the processing control unit 361 performs processes such as selecting a projection unit to be processed and managing a process count. Obviously, the processing control unit 361 may perform any process and is not limited to the above process.

The projection control unit 362 performs processes related to the control of image projection. For example, the projection control unit 362 may superimpose (composite) a pattern image (a positive image or a negative image of a structured light pattern) onto another image (such as a content image, for example), supply the composite image (superimposed image) to the projection unit 311, and control the projection of the composite image (superimposed image) by the projection unit 311. For example, the projection control unit 362 projects a pattern image according to the ISL method as described with reference to FIG. 7 and the like using the pattern image 100 containing the elliptical patterns 101 having a plurality of directions of brightness change and lengthwise directions, as illustrated in FIGS. 8 and 9. Obviously, the projection control unit 362 may perform any process and is not limited to the above process.

The imaging control unit 363 performs processes related to the control of the image capture of a projected image projected onto the projection plane by the projection unit 311. For example, the imaging control unit 363 controls the imaging unit 312 to capture an image of the projected image at a timing corresponding to the image projection by the projection unit 311 controlled by the projection control unit 362. That is, the imaging control unit 363 performs image capture corresponding to the projection of a pattern image according to the ISL method as described with reference to FIG. 7 and the like. In other words, the imaging control unit 363 controls the imaging unit 312 to generate a captured pattern image, which is a captured image of the structured light pattern projected superimposed onto another image.

Because the projection imaging device 302 is installed near the projection plane, the imaging unit 312 will capture an image in a direction looking up from below near the projection plane for example, as described with reference to FIGS. 10, 11A, 11B, and 12 and the like. In other words, under control by the imaging control unit 363, a captured pattern image having a composition like that of the captured pattern image 122 illustrated in FIG. 12 is generated, for example. Obviously, the imaging control unit 363 may perform any process and is not limited to the above process.

Note that the blocks are capable of exchanging information (such as commands and data, for example) with each other as necessary.

<Corresponding Point Detection Processing Unit>

Figure 18:
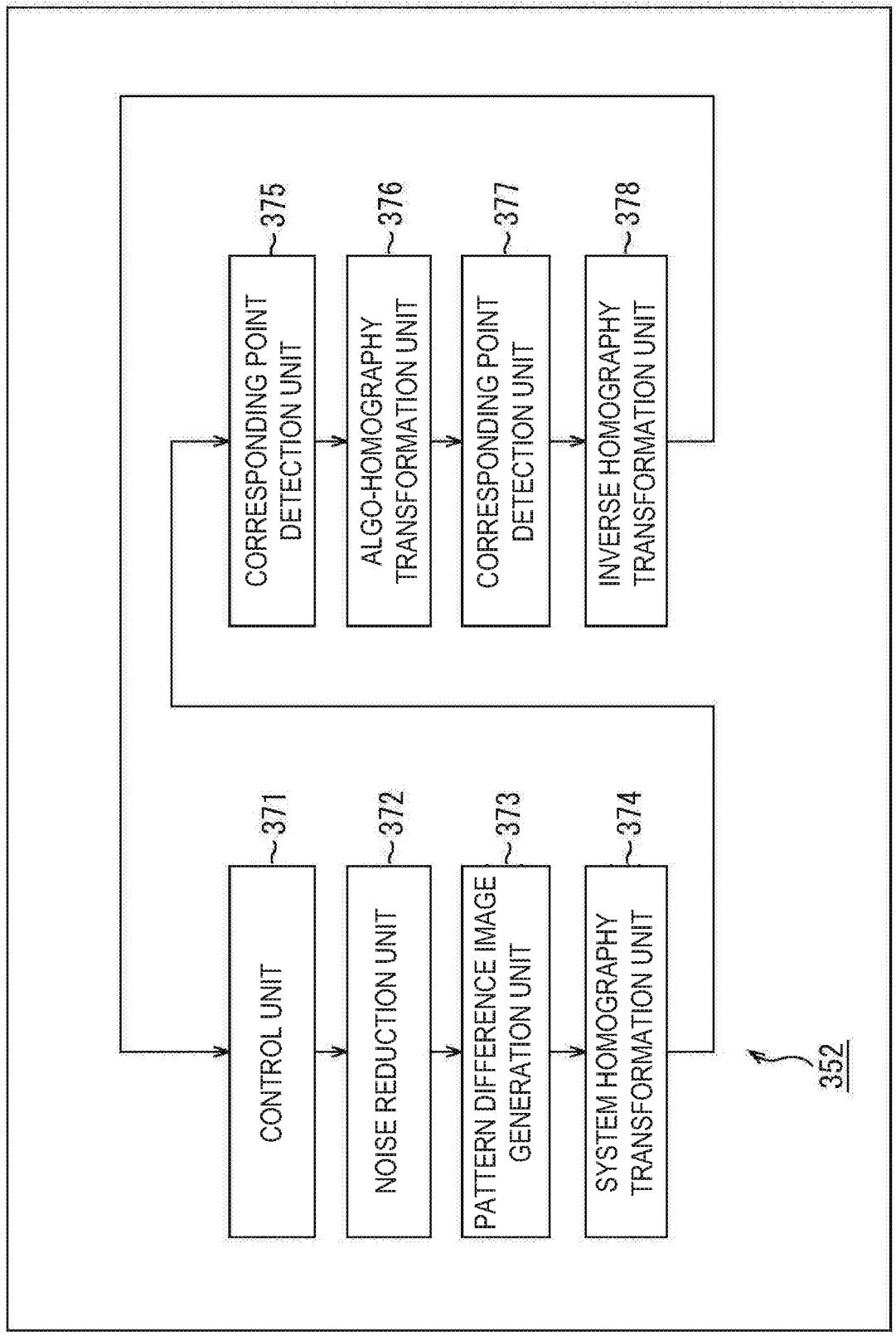
FIG. 18 is a function block diagram illustrating exemplary functions realized by a corresponding point detection processing unit.

An example of the functions included in the corresponding point detection processing unit 352 is illustrated in FIG. 18. In FIG. 18, the corresponding point detection processing unit 352 includes functions illustrated by function blocks such as a control unit 371, a noise reduction unit 372, a pattern difference image generation unit 373, a system homography transformation unit 374, a corresponding point detection unit 375, an algo-homography transformation unit 376, a corresponding point detection unit 377, and an inverse homography transformation unit 378, for example.

The control unit 371 performs processes related to the control of corresponding point detection. For example, the control unit 371 performs processes such as selecting a captured pattern image to be processed. Obviously, the control unit 371 may perform any process and is not limited to the above process.

The noise reduction unit 372 performs processes related to the reduction of noise in a captured image. For example, the noise reduction unit 372 reduces noise (improves the S/N ratio) in the captured pattern image by adding captured pattern images (for example, captured pattern images containing positive images or captured pattern images containing negative images) obtained by the imaging unit 312 capturing images of the projected image of composite images (superimposed images) in which pattern images of the same type are composited with (superimposed onto) a content image and projected by the projection unit 311. In other words, the captured images of each of a plurality of projected images containing structured light patterns having the same direction of brightness change are added together. Obviously, the noise reduction unit 372 may perform any process and is not limited to the above process.

The pattern difference image generation unit 373 performs processes related to the detection of the pattern 101. For example, the pattern difference image generation unit 373 generates a pattern difference image by computing the difference between captured pattern images obtained by capturing images of the projected image of composite images (superimposed images) in which pattern images of different types are composited with (superimposed onto) a content image (for example, by subtracting a captured pattern image containing a negative image from a captured pattern image containing a positive image). In other words, the pattern difference image is a difference image of the respective captured images of two projected images containing structured light patterns having the same shape as each other and also having mutually opposing directions of brightness change.

Due to the difference, in the pattern difference image, the component of the content image contained in the captured pattern images is canceled out and suppressed, and conversely, the components of the pattern 101 are composited such that the directions of brightness change become the same direction as each other and become emphasized. That is, according to this process, the pattern 101 is detected from the captured pattern images. In other words, the pattern difference image is an image containing the detected pattern 101. Obviously, the pattern difference image generation unit 373 may perform any process and is not limited to the above process.

The system homography transformation unit 374 performs processes related to the homography transformation based on design values. For example, the system homography transformation unit 374 performs processes like those described in <System homography transformation> and the like of <1. ISL method and corresponding point detection>.

For example, by applying the system homography transformation to the pattern difference image generated by the pattern difference image generation unit 373, the system homography transformation unit 374 projects the pattern 101 in the pattern difference image (that is, a plane in which the pattern 101 is arranged) onto the plane of the projection plane as seen from the front. Obviously, the system homography transformation unit 374 may perform any process and is not limited to the above process.

The corresponding point detection unit 375 performs processes related to the detection of corresponding points. For example, the corresponding point detection unit 375 performs processes like those described in <System homography transformation> and the like of <1. ISL method and corresponding point detection>. For example, the corresponding point detection unit 375 uses the pattern 101 in the system homography-transformed pattern difference image to detect corresponding points between the projected image and the captured image (in other words, the correspondence relationship between the pixels of the projection unit 311 and the pixels of the imaging unit 312). Obviously, the corresponding point detection unit 375 may perform any process and is not limited to the above process.

The algo-homography transformation unit 376 performs processes related to the nomography transformation based on corresponding points. For example, the algo-homography transformation unit 376 performs processes like those described in <Algo-homography transformation> and the like of <1. ISL method and corresponding point detection>. For example, by applying the algo-homography transformation to the system nomography-transformed pattern difference image, the algo-homography transformation unit 376 projects the pattern 101 in the pattern difference image (that is, a plane in which the pattern 101 is arranged) onto the plane of image to be projected by the projection unit 311 (or the projected image). Obviously, the algo-homography transformation unit 376 may perform any process and is not limited to the above process.

The corresponding point detection unit 377 performs processes related to the detection of corresponding points. For example, the corresponding point detection unit 377 performs processes like those described in <Algo-homography transformation> and the like of <1. ISL method and corresponding point detection>. For example, the corresponding point detection unit 377 uses the pattern 101 in the algo-homography-transformed pattern difference image to detect corresponding points between the projected image and the captured image (in other words, the correspondence relationship between the pixels of the projection unit 311 and the pixels of the imaging unit 312). Obviously, the corresponding point detection unit 377 may perform any process and is not limited to the above process.

The inverse homography transformation unit 378 performs processes related to the inverse homography transformation. For example, the inverse homography transformation unit 378 performs processes like those described in <System homography transformation>, <Algo-homography transformation>, and the like of <1. ISL method and corresponding point detection>. For example, the inverse homography transformation unit 378 performs the inverse algo-homography transformation and the inverse system homography transformation on a corresponding point P detected by the corresponding point detection unit 377 to revert back to the coordinate system of the original pattern difference image.

In other words, these processing units performs processes like those described with reference to FIGS. 12, 13A, and 13B, and the like, for example. Note that the blocks are capable of exchanging information (such as commands and data, for example) with each other as necessary.

<Projection Imaging Device>

Figure 19:
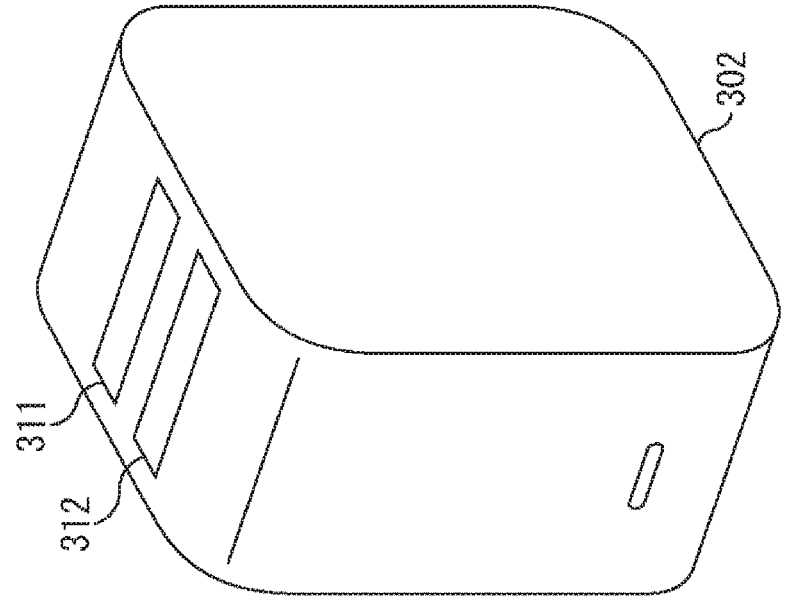
FIG. 19 is a diagram illustrating an example of a housing of the projection imaging device.

FIG. 19 is a perspective view illustrating the state of the external appearance of the projection imaging device 302. As illustrated in FIG. 19, the projection unit 311 and the imaging unit 312 are securely provided at predetermined positions in a housing of the projection imaging device 302. The projection unit 311 is formed to perform projection at a predetermined angle with respect to the housing, and the imaging unit 312 is formed to capture an image at a predetermined angle with respect to the housing.

With this arrangement, the relative positions, the relative angles of projection and image capture, the angle of view, and the like of the projection unit 311 and the imaging unit 312 can be treated as preset, known information. Consequently, the system nomography transformation can be achieved easily. Also, because a baseline between the projection unit 311 and the imaging unit 312 can be secured, distortion of the projected image can be corrected with just the housing of the single projection imaging device 302.

Note that, as described above, the projection imaging device 302 is installed near the projection plane. Additionally, as illustrated in FIG. 19, the projection unit 311 and the imaging unit 312 are securely provided in the housing of the projection imaging device 302. Consequently, the projection unit 311 projects an image in a direction looking up from below near the projection plane for example, while the imaging unit 312 captures an image of the projected image projected onto the projection plane in a direction looking up from below near the projection plane for example. In other words, the captured pattern image obtained by the projection unit 312 becomes an image having a composition like that of the captured pattern image 122 in FIG. 12.

Figure 20:
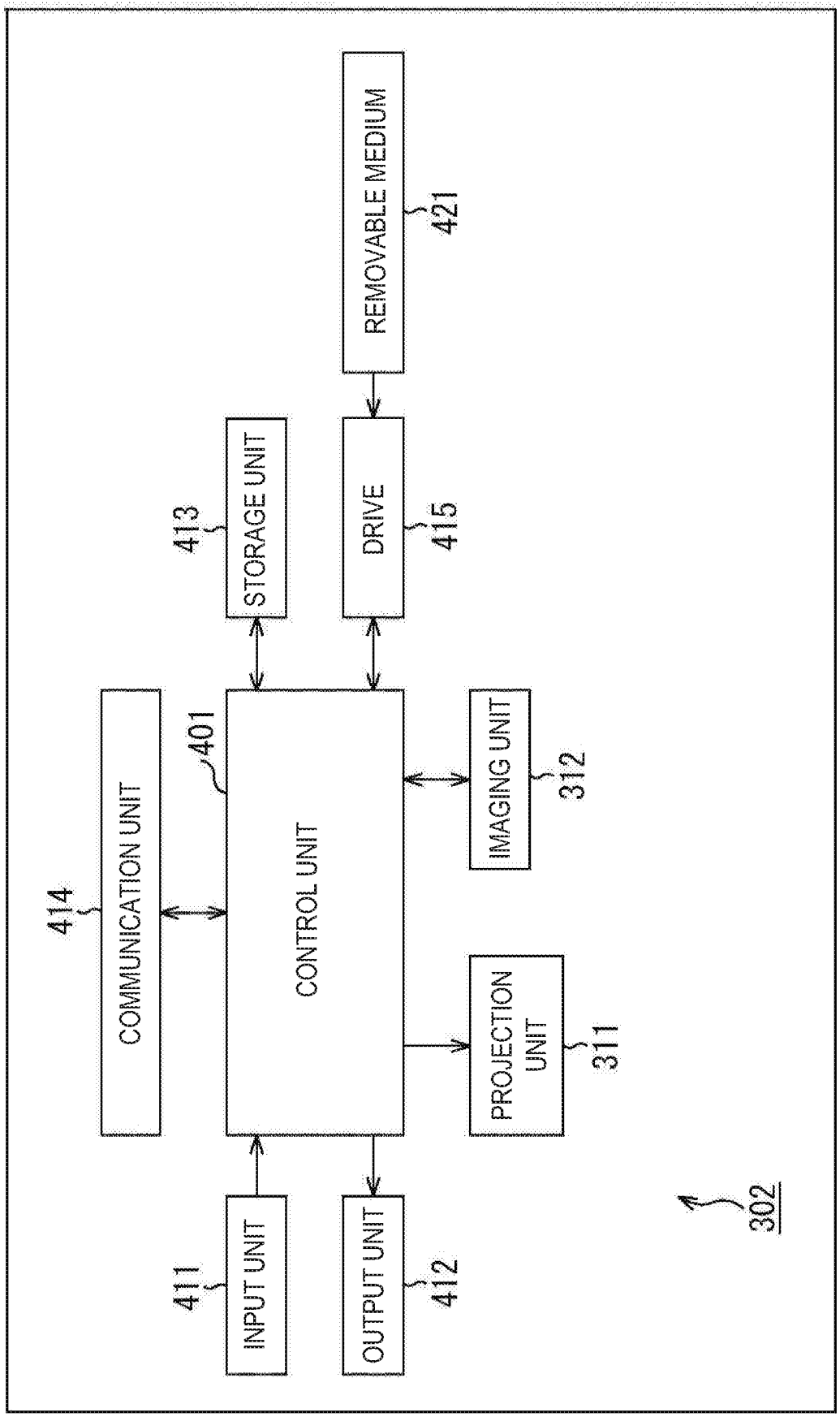
FIG. 20 is a block diagram illustrating an exemplary principal configuration of the projection imaging device.

FIG. 20 is a block diagram illustrating an exemplary principal configuration of the projection imaging device 302. As illustrated in FIG. 20, the projection imaging device 302 includes a control unit 401, the projection unit 311, the imaging unit 312, an input unit 411, an output unit 412, a storage unit 413, a communication unit 414, and a drive 415.

The control unit 401 includes a CPU, ROM, RAM, and the like, for example, and controls each processing unit inside the device and executes various processes required for the control, such as image processing for example. The control unit 401 performs these processes on the basis of control by the control device 301 for example.

The projection unit 311 is controlled by the control unit 401 to perform processes related to the projection of an image. For example, the projection unit 311 projects an image supplied from the control unit 401 outside the projection imaging device 302 (such as onto the projection plane for example). The projection unit 311 projects an image by using laser beams as a light source and scanning the laser beams using microelectromechanical systems (MEMS). Obviously, the projection unit 311 may have any light source and is not limited to laser beams. For example, the light source may also be a light-emitting diode (LED), xenon, or the like.

The imaging unit 312 is controlled by the control unit 401 to capture an image of a subject external to the device (such as the projection plane for example), generate a captured image, and supply the captured image to the control unit 401. For example, the imaging unit 312 captures an image of a projected image projected onto the projection plane by the projection unit 311. The imaging unit 312 includes an image sensor using a complementary metal-oxide semiconductor (CMOS), an image sensor using a charge-coupled device (CCD), or the like for example, and uses the image sensor to photoelectrically convert light from the subject and generate an electric signal (data) of the captured image.

The input unit 411 includes input devices that receives external information such as user input. For example, the input unit 411 includes an operation button, a touch panel, a camera, a microphone, an input terminal, and the like. Additionally, various sensors such as an optical sensor and a temperature sensor may also be included in the input unit 411. The output unit 412 includes output devices that output information such as images and sound. For example, the output unit 412 includes a display, a speaker, an output terminal, and the like.

The storage unit 413 includes a hard disk, a RAM disk, non-volatile memory, and the like, for example. The communication unit 414 includes a network interface, for example. For example, the communication unit 414 is connected to the communication cable 303 and is capable of communicating with the control device 301 connected through the communication cable 303. Note that the communication unit 414 may have wired communication functions, wireless communication functions, or both. The drive 415 drives a removable medium 421 such as a magnetic disk, an optical disc, a magneto-optical disc, or semiconductor memory for example.

<Projection Unit>

Figure 21:
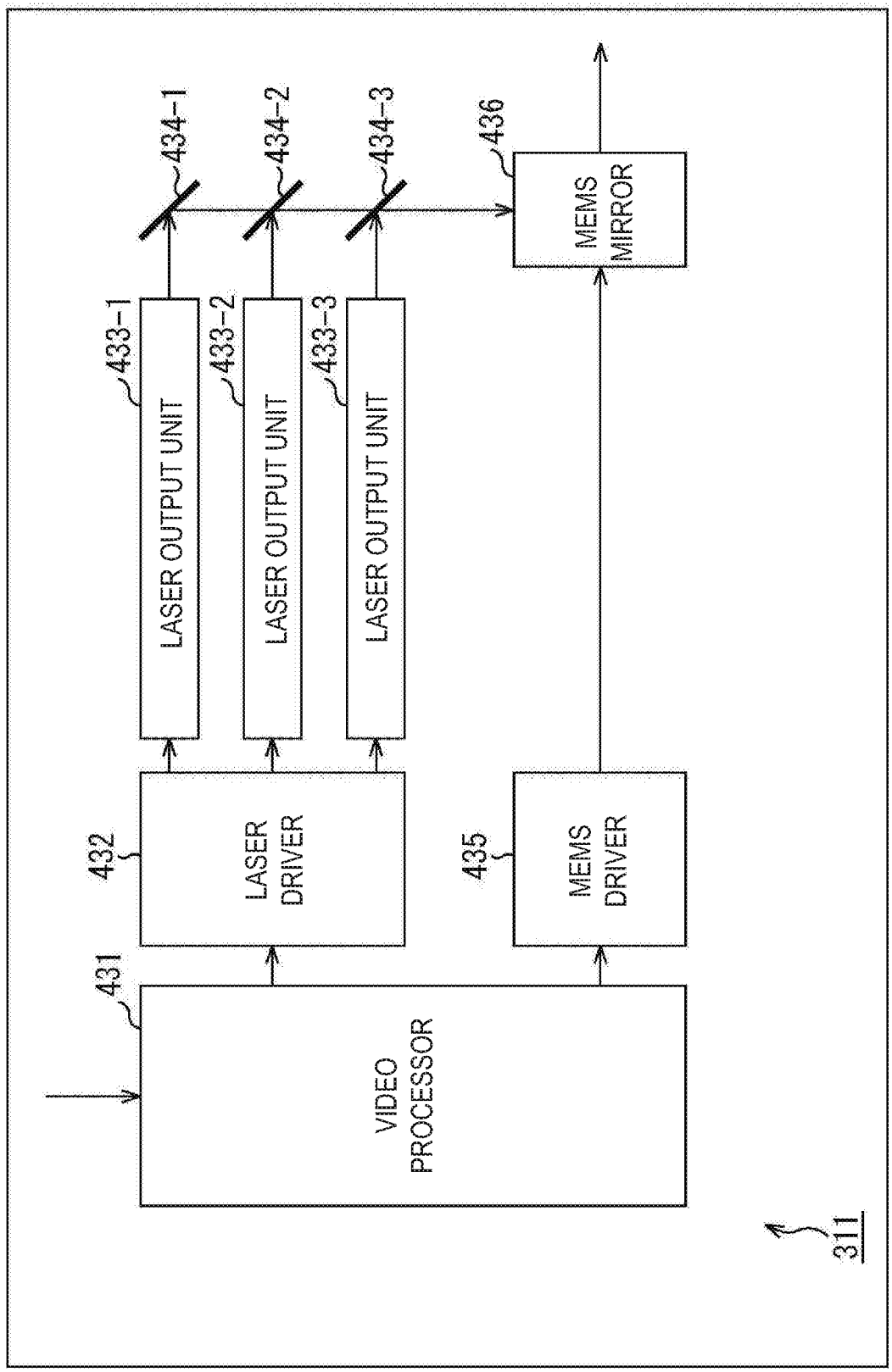
FIG. 21 is a block diagram illustrating an exemplary principal configuration of a projection unit.

FIG. 21 is a block diagram illustrating an exemplary principal configuration of the projection unit 311. As illustrated in FIG. 21, the projection unit 311 includes a video processor 431, a laser driver 432, a laser output unit 433-1, a laser output unit 433-2, a laser output unit 433-3, a mirror 434-1, a mirror 434-2, a mirror 434-3, a MEMS driver 435, and a MEMS mirror 436.

The video processor 431 holds an image supplied from the control unit 401 and performs necessary image processing on the image. The video processor 431 supplies the image to project to the laser driver 432 and the MEMS driver 435.

The laser driver 432 controls the laser output units 433-1 to 433-3 to project the image supplied from the video processor 431. For example, the laser output units 433-1 to 433-3 output laser beams of mutually different colors (wavelength bands), such as red, blue, and green, for example. In other words, the laser driver 432 controls the output of the laser of each color to project the image supplied from the video processor 431. Note that the laser output units 433-1 to 433-3 will be referred to as the laser output unit(s) 433 in a case where it is not necessary to distinguish among them in the description.

The mirror 434-1 reflects the laser beam output from the laser output unit 433-1 and guides the laser beam to the MEMS mirror 436. The mirror 434-2 reflects output from the laser output unit 433-2 and guides the laser beam to the MEMS mirror 436. The mirror 434-3 reflects the laser beam output from the laser output unit 433-3 and guides the laser beam to the MEMS mirror 436. Note that the mirrors 434-1 to 434-3 will be referred to as the mirror(s) 434 in a case where it is not necessary to distinguish among them in the description.

Figure 22:
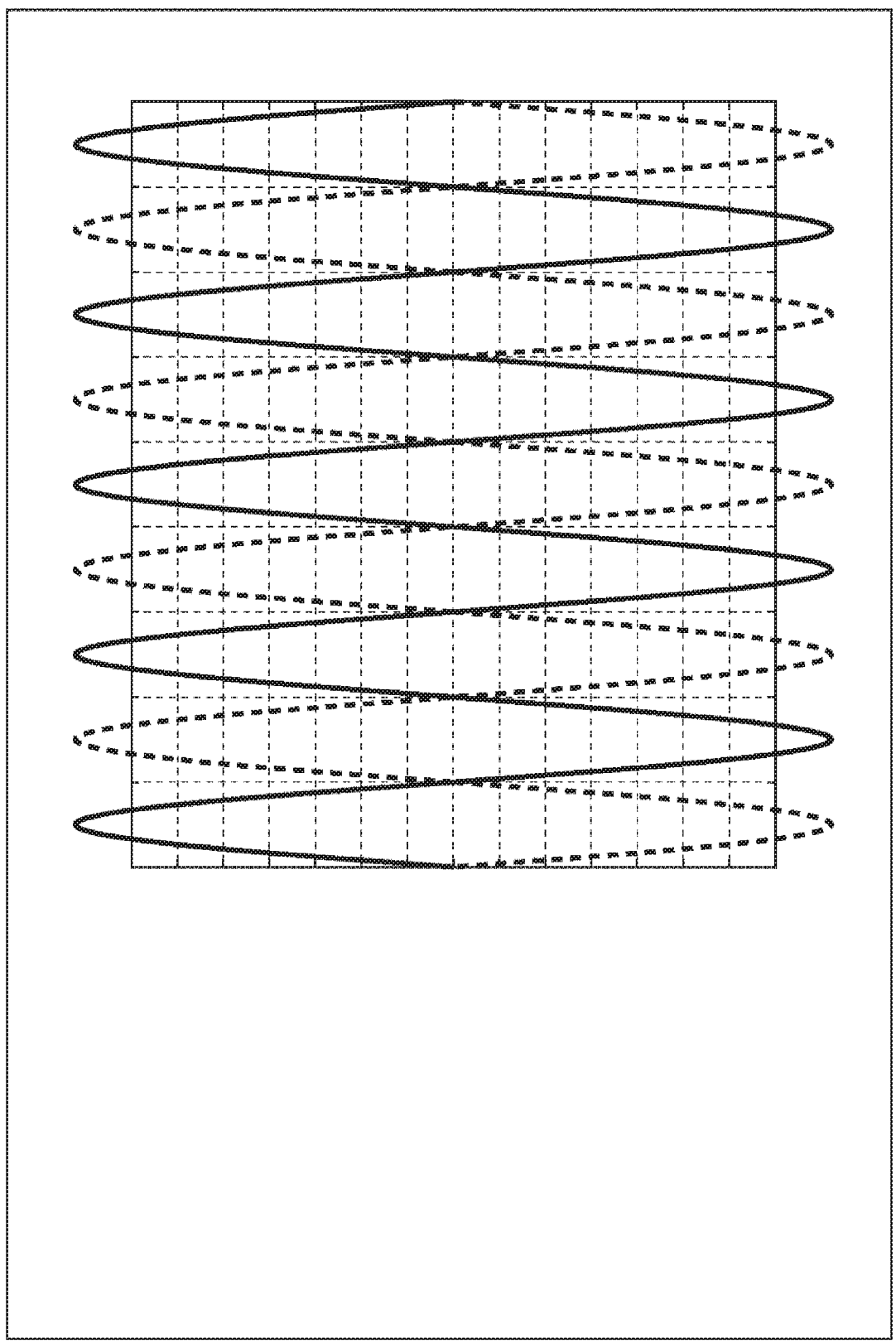
FIG. 22 is a diagram illustrating an example of laser beam scanning.

The MEMS driver 435 controls the driving of the mirror in the MEMS mirror 436 to project the image supplied from the video processor 431. The MEMS mirror 436 scans the laser beam of each color like in the example of FIG. 22 by driving a mirror attached to the MEMS in accordance with control by the MEMS driver 435, for example. The laser beams are output outside the device from a projection aperture and radiated onto the projection plane for example. With this arrangement, the image supplied from the video processor 431 is projected onto the projection plane.

Note that the example of FIG. 21 is described as being provided with three laser output units 433 that output laser beams of three colors, but there may be any number of laser beams (or any number of colors). For example, there may four or more laser output units 433, or there may be two or fewer laser output units 433. In other words, the number of laser beams output from the projection imaging device 302 (projection unit 311) may be two or fewer, or four or more. Additionally, the number of colors of the laser beams output from the projection imaging device 302 (projection unit 311) may be two or fewer, or four or more. Also, the mirrors 434 and the MEMS mirror 436 may be configured in any way and are not limited to the example in FIG. 21. Obviously, any laser beam scanning pattern may be used.

<Flow of Geometric Correction Process>

Next, a process executed in the projection imaging system 300 having such a configuration will be described. As described above, in the projection imaging system 300, the control device 301 controls each projection imaging device 302, uses online sensing according to the ISL method to perform corresponding point detection between each projection unit 311 and each imaging unit 312 while projecting an image of content or the like, and on the basis of the corresponding points, estimates the attitude and the like of each projection unit and each imaging unit 312, performs projection plane formation, and the like, and performs geometric correction of the image to project.

An example of the flow of the geometric correction process executed in the control device 301 to achieve the above processes will be described with reference to the flowchart in FIG. 23.

When the geometric correction process is started, in step S101, the projection imaging processing unit 351 of the control device 301 executes a projection imaging process and performs processes related to the control of projection and image capture. For example, the projection imaging processing unit 351 causes the projection imaging device 302 to project a structured light pattern and capture an image of the projected image. These processes related to projecting a structured light pattern and capturing an image of the projected image will be described in detail later, but include processes like those described with reference to FIG. 7 and the like, for example.

In step S102, the corresponding point detection processing unit 352 executes the corresponding point detection process, and performs processes related to corresponding points detection. For example, the corresponding point detection processing unit 352 causes the projection imaging device 302 to detect corresponding points on the basis of the captured image obtained by the process in step S101. The corresponding point detection process will be described in detail later, but includes processes like those described in <System nomography transformation>, <Algo-homography transformation>, and the like of <1. ISL method and corresponding point detection>, for example.

In step S103, the geometric correction processing unit 353 uses the detected corresponding points to estimate the attitude of each projection unit 311 and each imaging unit 312 (or each projection imaging device 302) and to perform projection screen reconfiguration. Projection screen reconfiguration refers to a process of estimating the shape of a projection screen that acts as the projection plane.

In step S104, on the basis of the processing results of the attitude estimation and the projection screen reconfiguration in step S103, the geometric correction processing unit 353 performs geometric correction on the image to be projected from each projection unit 311 as necessary.

When geometric correction ends, the geometric correction process ends. The control device 301 executes this geometric correction process for all combinations of the projection unit(s) 311 and the imaging unit(s) 312.

<Flow of Projection Imaging Process>

Next, an example of the flow of the projection imaging process executed in step S101 of FIG. 23 will be described with reference to the flowchart in FIG. 24.

When the projection imaging process is started, in step S121, the processing control unit 361 selects a projection unit 311 to be processed from among the unprocessed projection unit(s) 311.

In step S122, the projection control unit 362 performs processes related to the projection of a positive image of a structured light pattern by the projection unit 311 to be processed. For example, the projection control unit 362 acquires a positive image of a structured light pattern as illustrated in FIG. 8 or 9, and a content image that acts as an input image. Subsequently, as illustrated in FIG. 7 for example, the projection control unit 362 superimposes the positive image onto the content image to generate a superimposed image. Also, the projection control unit 362 supplies the superimposed image to the projection unit 311 to be processed having been selected in step S121 through the communication unit 334, the cable 303, and the like, and causes the superimposed image to be projected as illustrated in FIG. 7 for example. Following this control, the projection unit 311 to be processed acquires the superimposed image and the like supplied from the control device 301 (projection control unit 362) through the communication unit 414, and projects the superimposed image toward the projection plane at a predetermined timing.

In step S123, the imaging control unit 363 performs processes related to capturing an image of the projected image by each imaging unit 312. For example, the imaging control unit 363 controls each imaging unit 312, and as illustrated in FIG. 7 for example, causes each imaging unit 312 to capture the projected image projected from the projection unit 311 to be processed (the projected image of the superimposed image of the positive image of the structured light pattern and the content image) according to the processes in step S122. Following this control, each imaging unit 312 captures an image of the projected image and generates a captured pattern image. Also, each imaging unit 312 supplies the generated captured pattern image to the control device 301 (imaging control unit 363) through the communication unit 414, the cable 303, and the like. The imaging control unit 363 acquires each captured pattern image through the communication unit 334.

In step S124, the projection control unit 362 performs processes similar to the processes in step S122 for a negative image of the structured light pattern. For example, the projection control unit 362 acquires a negative image of a structured light pattern as illustrated in FIG. 8 or 9, and a content image that acts as an input image. Subsequently, as illustrated in FIG. 7 for example, the projection control unit 362 superimposes the negative image onto the content image to generate a superimposed image. Also, the projection control unit 362 supplies the superimposed image to the projection unit 311 to be processed having been selected in step S121 through the communication unit 334, the cable 303, and the like, and causes the superimposed image to be projected as illustrated in FIG. 7 for example. Following this control, the projection unit 311 to be processed acquires the superimposed image and the like supplied from the control device 301 (projection control unit 362) through the communication unit 414, and projects the superimposed image toward the projection plane at a predetermined timing.

In step S125, the imaging control unit 363 performs processes related to capturing an image of the projected image by each imaging unit 312, similarly to the processes in step S123. For example, the imaging control unit 363 controls each imaging unit 312, and as illustrated in FIG. 7 for example, causes each imaging unit 312 to capture the projected image projected from the projection unit 311 to be processed (the projected image of the superimposed image of the negative image of the structured light pattern and the content image) according to the processes in step S122. Following this control, each imaging unit 312 captures an image of the projected image and generates a captured pattern image. Also, each imaging unit 312 supplies the generated captured pattern image to the control device 301 (imaging control unit 363) through the communication unit 414, the cable 303, and the like. The imaging control unit 363 acquires each captured pattern image through the communication unit 334.

In step S126, the processing control unit 361 determines whether or not projection and image capture (each process from step S122 to step S125) has been repeated a predetermined number of times. In order to reduce noise (improve the S/N ratio) in the captured image, the processing control unit 361 causes the projection and image capture described above to be performed multiple times to obtain multiple captured pattern images containing structured light patterns of the same type. For this reason, the processing control unit 361 makes a determination as described above in step S126. Subsequently, in the case of determining that the predetermined number of times has not been reached, the process is returned to step S122 and is repeated from that point.

In a case where the process from step S122 to step S126 is repeatedly executed as above and it is determined in step S126 that the process has been repeated the predetermined number of times, the process proceeds to step S127.

In step S127, the processing control unit 361 determines whether or not each process from step S122 to step S125 has been executed for all projection units 311. The processing control unit 361 causes each process from step S122 to step S125 to be executed for all projection units 311. For this reason, the processing control unit 361 makes a determination as described above in step S127. Subsequently, in the case of determining that an unprocessed projection unit 311 exists, the process returns to step S121. When the process returns to step S121, in step S121, a new projection unit 311 is selected as the projection unit 311 to be processed, and the process from step S122 to step S127 is performed on the newly selected projection unit 311.

In other words, in a case where multiple projection units 311 (or projection imaging devices 302) exist, the process from step S121 to step S127 is executed repeatedly as above, and image of the structured light pattern are successively projected from each projection unit. Additionally, in a case where multiple imaging units 312 (or projection imaging devices 302) exist, each imaging unit 312 captures an image of the projected image projected from each projection unit 311 (in other words, the multiple imaging units 312 capture images of the same projected image). In step S127, in the case of determining that the process has been performed on all projection units 311, the projection imaging process ends, and the process returns to FIG. 23.

<Flow of Corresponding Point Detection Process>

Figure 25:
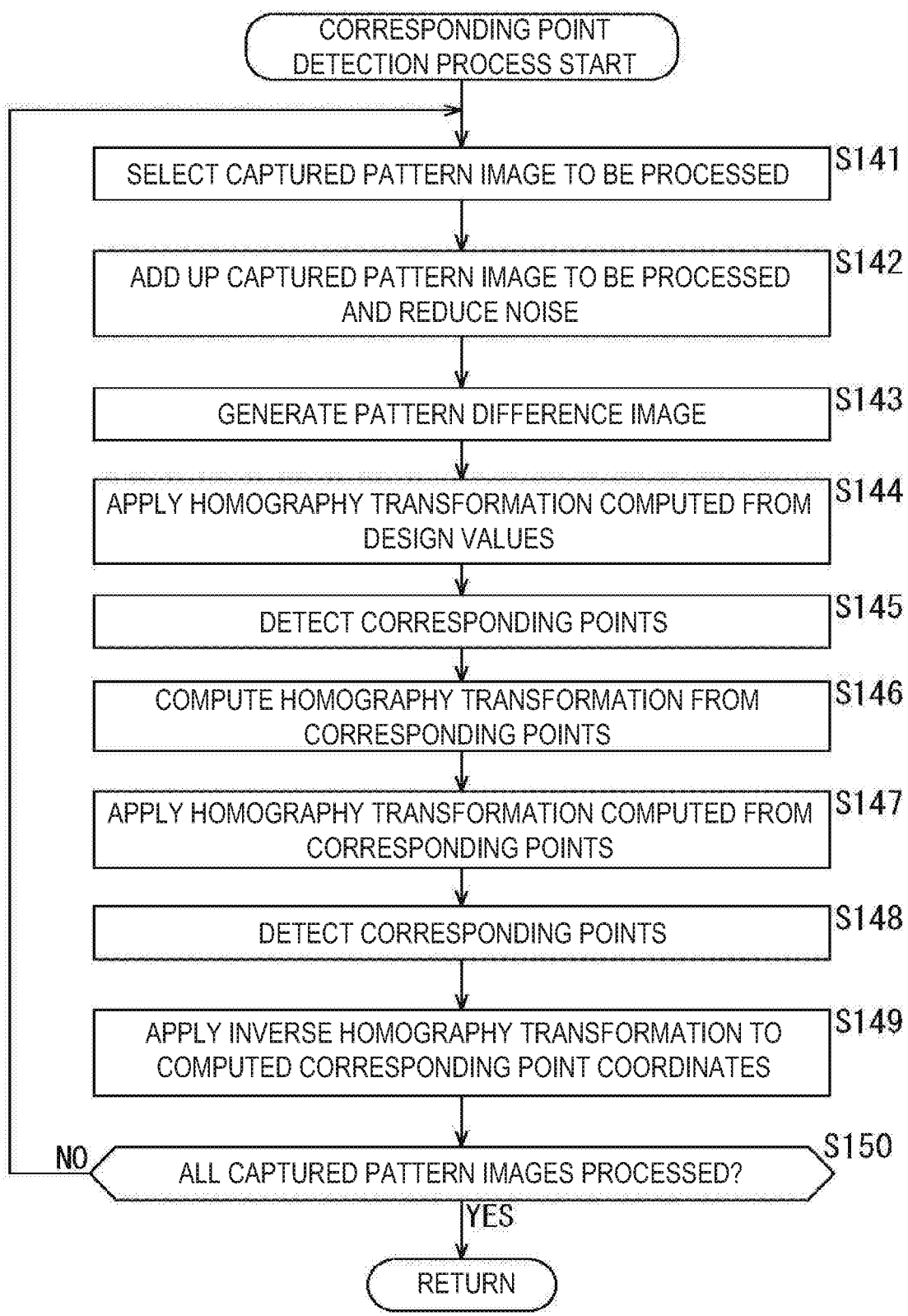
FIG. 25 is a flowchart explaining an example of the flow of a corresponding point detection process.

Next, an example of the flow of the corresponding point detection process executed in step S102 of FIG. 23 will be described with reference to the flowchart in FIG. 25.

When the corresponding point detection process is started, in step S141, the control unit 371 selects a captured pattern image to be processed from among the unprocessed captured pattern image(s).

In step S142, the noise reduction unit 372 adds the captured pattern image to be processed having been selected in step S141 to a captured image of the projected image of the composite image (superimposed image) in which a pattern image of the same type as the pattern image contained in the captured pattern image is composited with (superimposed onto) a content image (that is, to a captured pattern image containing a pattern image of the same type), and reduces noise (improves the S/N ratio) in the captured image.

In step S143, the pattern difference image generation unit 373 generates a pattern difference image, which is a difference image between captured pattern images of which noise is reduced by the process in step S142 and which contain pattern images (a positive image or a negative image) of mutually different types.

In step S144, the system homography transformation unit 374 applies, to the pattern difference image obtained by the process in step S143, a homography transformation (system homography transformation) based on design values of the projection unit 311 and the imaging unit 312, as described in <System homography transformation> and the like of <1. ISL method and corresponding point detection> for example. For example, the system homography transformation unit 374 uses the design values of the projection unit 311 and the imaging unit 312 to compute the system homography matrix Hs from the four corner points of the projected image. Subsequently, the system homography transformation unit 374 uses the system homography matrix Hs to perform the system homography transformation on the pattern difference image obtained by the process in step S143.

In step S145, the corresponding point detection unit 375 detects corresponding points between the pixels of the projection unit 311 and the pixels of the imaging unit 312 using the pattern of the system homography-transformed pattern difference image obtained by the process in step S144, as described in <System homography transformation> and the like of <1. ISL method and corresponding point detection> for example.

In step S146, the algo-homography transformation unit 376 computes a homography transformation from the corresponding points detected by the process in step S145, as described in <Algo-homography transformation> and the like of <1. ISL method and corresponding point detection> for example. For example, the algo-homography transformation unit 376 uses the corresponding points detected by the process in step S145 to compute the algo-homography matrix Ha.

In step S147, the algo-homography transformation unit 376 applies the homography transformation (algo-homography transformation) based on corresponding points to the pattern difference image obtained by the process in step S143, as described in <Algo-homography transformation> and the like of <1. ISL method and corresponding point detection> for example. For example, the algo-homography transformation unit 376 uses the algo-homography matrix Ha obtained by the process in step S146 to perform the algo-homography transformation on the pattern difference image obtained by the process in step S143.

In step S148, the corresponding point detection unit 377 detects corresponding points between the pixels of the projection unit 311 and the pixels of the imaging unit 312 using the pattern of the algo-homography-transformed pattern difference image obtained by the process in step S147, as described in <Algo-homography transformation> and the like of <1. ISL method and corresponding point detection> for example.

In step S149, the inverse homography transformation unit 378 applies an inverse homography transformation that is the inverse transformation of the homography transformation described above to the corresponding points computed by the process in step S148, as described in <System homography transformation>, <Algo-homography transformation>, and the like of <1. ISL method and corresponding point detection> for example. For example, the inverse homography transformation unit 378 applies an inverse algo-homography transformation that is the inverse transformation of the process in step S147 and an inverse system homography transformation that is the inverse transformation of the process in step S144 to the corresponding points computed by the process in step S148.

In step S150, the control unit 371 determines whether or not all captured pattern images have been processed. In the case of determining that an unprocessed captured pattern image exists, the process returns to step S141. Subsequently, in step S141, a new unprocessed captured pattern image is selected as the captured pattern image to be processed. Additionally, the process from step S142 to step S150 is performed on the newly selected captured pattern image to be processed.

Figure 23:
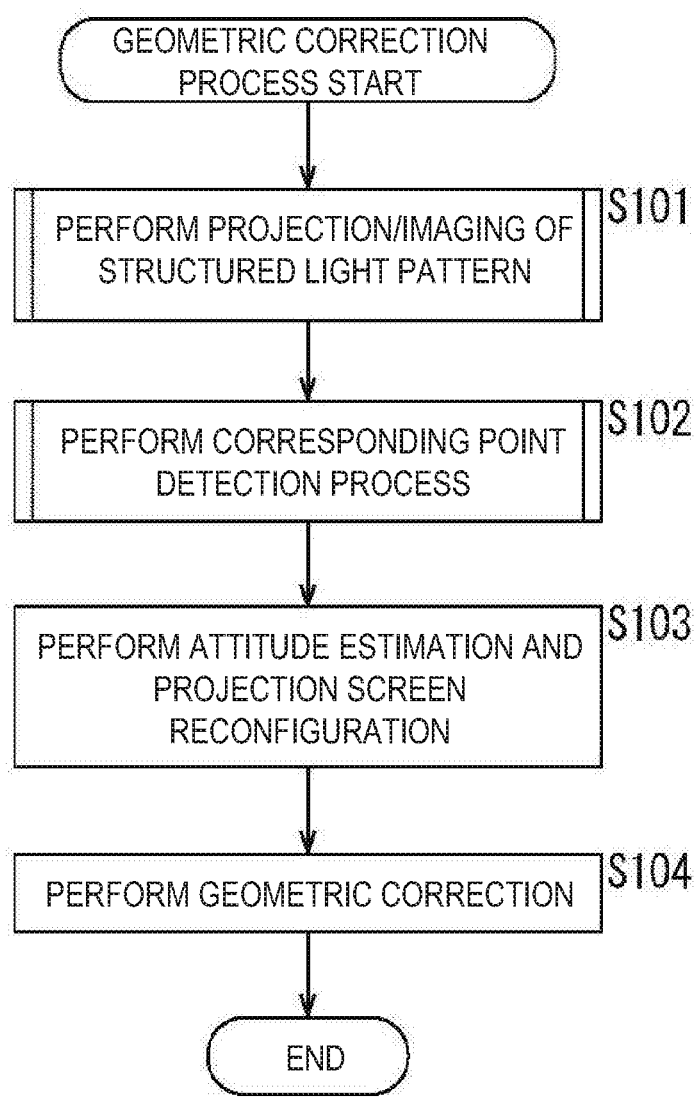
FIG. 23 is a flowchart explaining an example of the flow of a geometric correction process.
Figure 24:
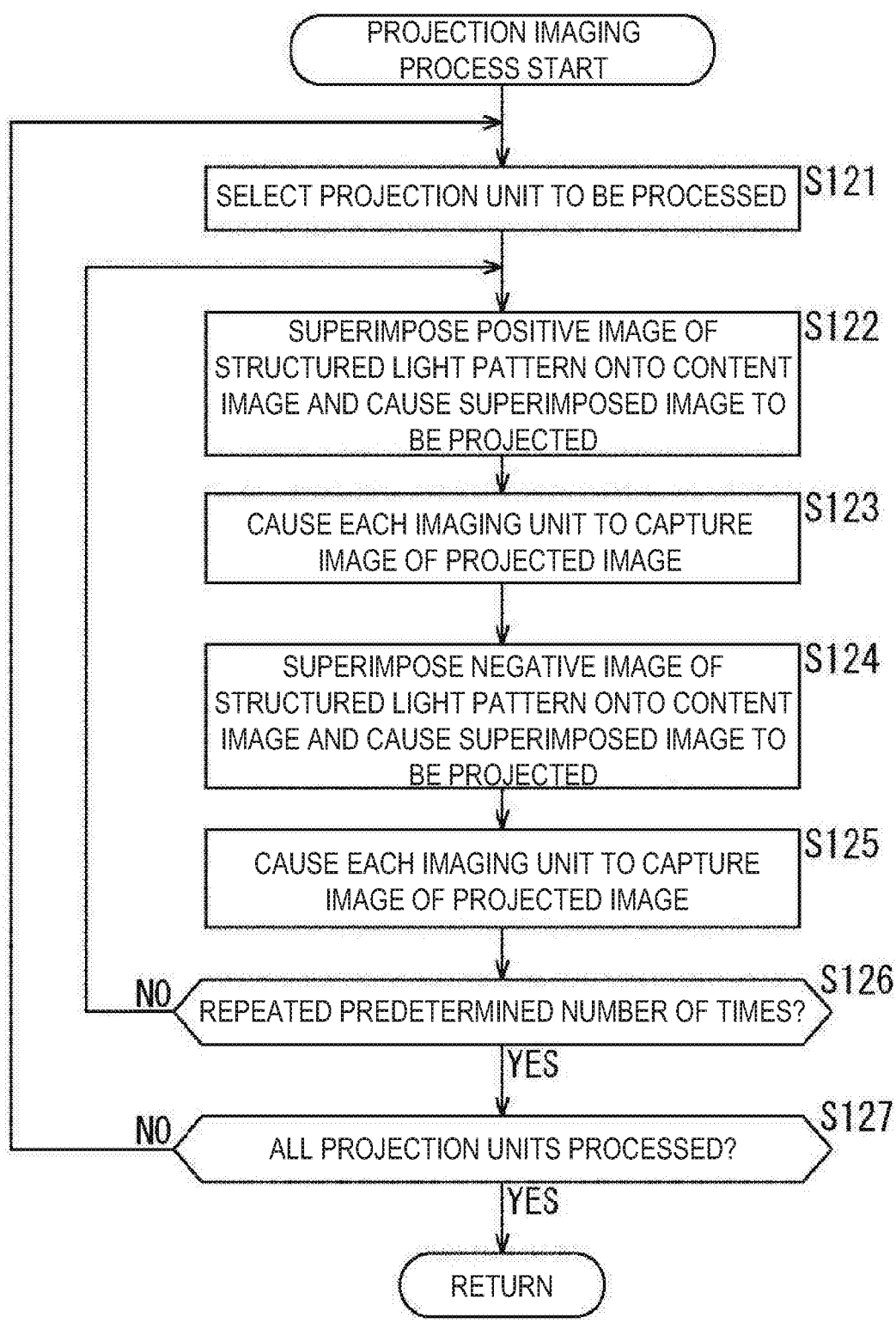
FIG. 24 is a flowchart explaining an example of the flow of a projection imaging process.

In this way, each process from step S141 to step S150 is repeatedly executed, and in the case of determining in step S150 that all captured pattern images have been processed, the corresponding point detection process ends, and the process returns to FIG. 23. In other words, each processing unit of the corresponding point detection processing unit 352 executes processes like those described with reference to FIGS. 12, 13A, and 13B, and the like.

By executing each process as above, a reduction in the accuracy of corresponding point detection can be suppressed, as described in <1. ISL method and corresponding point detection>.

<Comparison of Number of Detected Corresponding Points>

Next, the influence of the homography transformation on the number of detected corresponding points will be described more specifically. For example, in the case of performing a simulation of detecting corresponding points with a captured pattern image before performing the homography transformation (for example, the captured pattern image 122 in FIG. 12), the number of successfully detected corresponding points is 415. In the case of applying the system homography transformation to the captured pattern image and performing a simulation of detecting corresponding points with the captured pattern image after performing the system homography transformation (for example, the captured pattern image 123 in FIG. 12), the number of successfully detected corresponding points increases to 461. Furthermore, in the case of applying the algo-homography transformation to the captured pattern image and performing a simulation of detecting corresponding points with the captured pattern image after performing the algo-homography transformation (for example, the captured pattern image 124 in FIG. 12), the number of successfully detected corresponding points increases to 735.

In other words, by applying homography transformations to the captured pattern image as described above and performing corresponding point detection, a reduction in the number of detected corresponding points can be suppressed. Typically, increasing the number of detected corresponding points makes it possible to perform geometric correction using more accurate corresponding points or on the basis of more information, and therefore the accuracy of the geometric correction can be improved. Because the accuracy of the geometric correction can be improved, this is equivalent to being able to improve the accuracy of corresponding point detection. In other words, by applying homography transformations to the captured pattern image as described above and performing corresponding point detection, a reduction in the accuracy of corresponding point detection can be suppressed.

<Comparison of corresponding point detection accuracy>

Figure 26A:
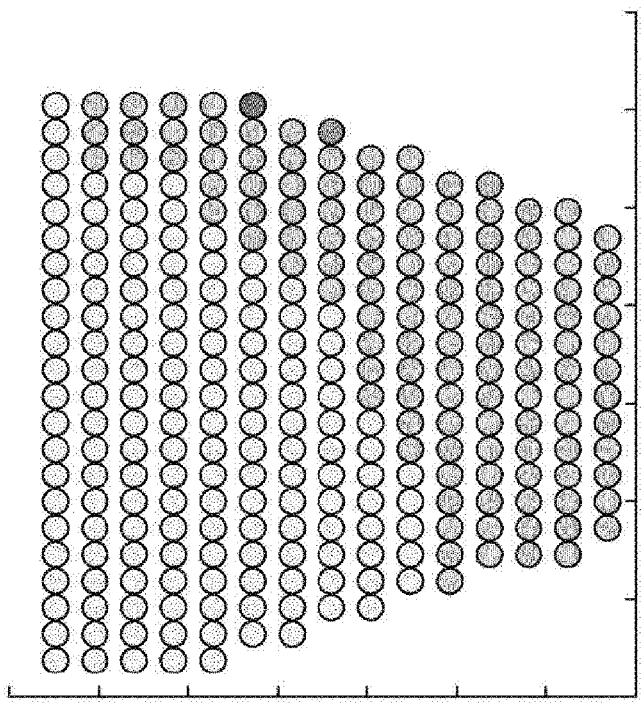
FIGS. 26A and 26B are diagrams illustrating an example of a pattern center-of-gravity detection result.
Figure 26B:
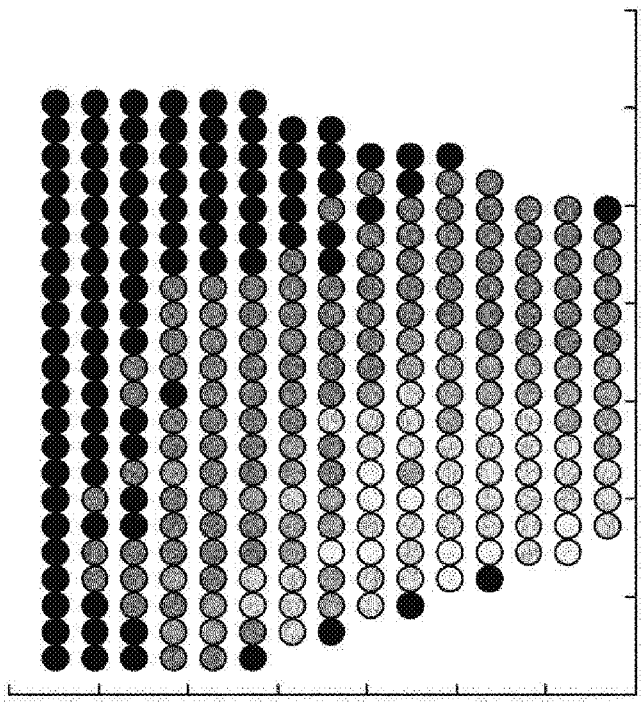

Next, the influence of the homography transformation on the accuracy of corresponding point detection will be described more specifically. FIG. 26A is a diagram illustrating an example of a corresponding point detection result and its accuracy in the case of detecting corresponding points with the captured pattern image before performing the homography transformation (for example, the captured pattern image 122 in FIG. 12). FIG. 26B is a diagram illustrating an example of a corresponding point detection result and its accuracy in the case of detecting corresponding points with the captured pattern image after performing the system homography transformation and the algo-homography transformation as the homography transformation (for example, the captured pattern image 124 in FIG. 12).

In FIG. 26A and FIG. 26B, each circle represents a corresponding point detected in the coordinates of the image to be projected. Also, the tone of each circle expresses the magnitude of the error of the corresponding point detection, with a denser tone illustrating a greater degree of error. As a comparison between FIG. 26A and FIG. 26B clearly demonstrates, the case of detecting corresponding points with the captured pattern image 124 (FIG. 26B) has less error than the case of detecting corresponding points with the captured pattern image 122 (FIG. 26A). In other words, by applying homography transformations to the captured pattern image as described above and performing corresponding point detection, a reduction in the accuracy of corresponding point detection can be suppressed.

<Comparison of Corresponding Point Detection Accuracy>

Next, description will made on the accuracy of corresponding point detection is compared between the case of disposing the imaging unit 312 with an ultra short focal point and performing corresponding point detection according to a method like the above (the case of capturing an image from near the projection plane) and the case of disposing the imaging unit 312 with a long focal point (the case of capturing an image from the front of the projection plane).

Figure 28:
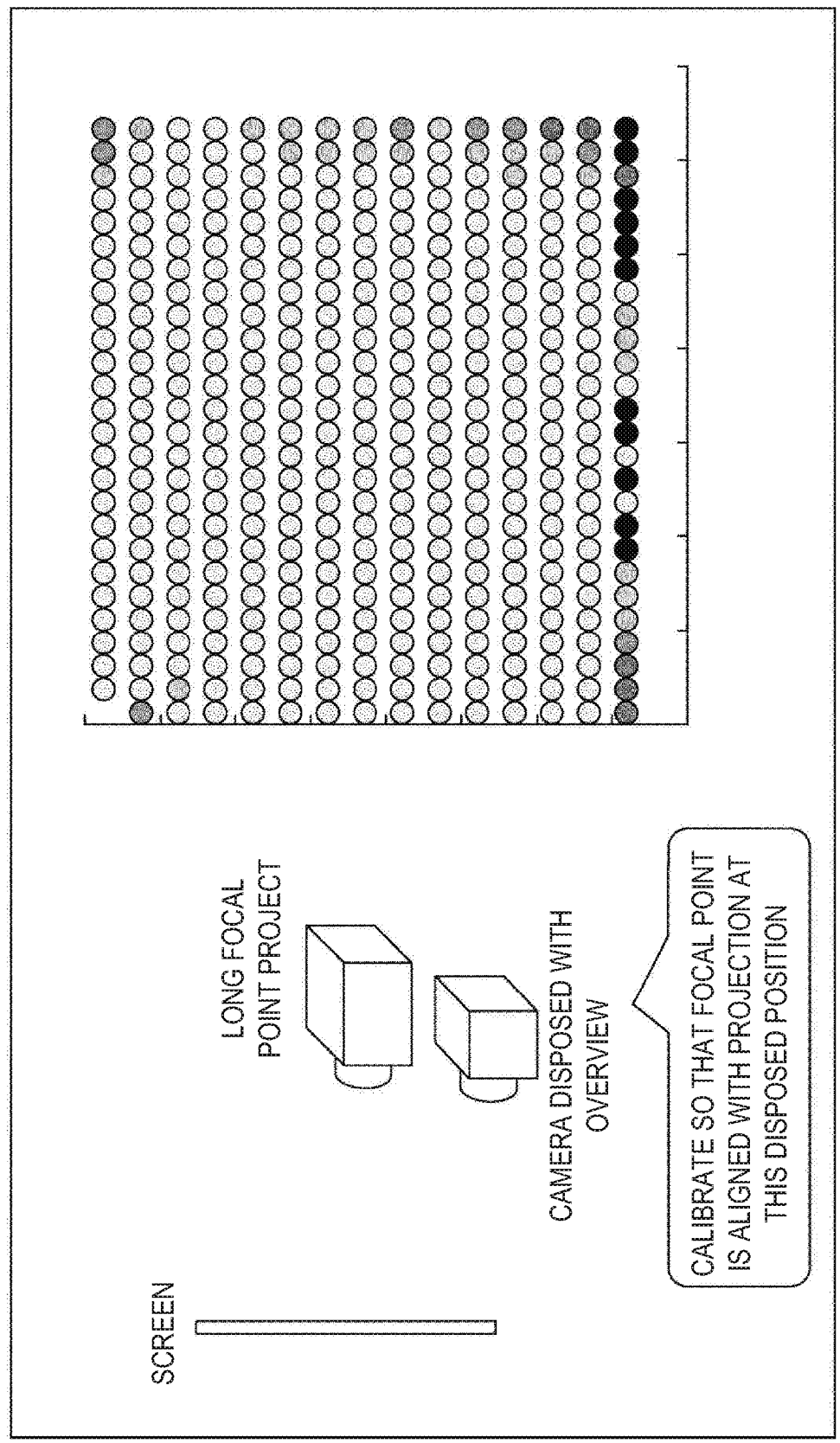
FIG. 28 is a diagram illustrating an example of homography transformation error.

An example of a corresponding point detection result and its accuracy in the case of capturing an image from near the projection plane is illustrated in FIG. 27. Also, an example of a corresponding point detection result and its accuracy in the case of capturing an image from the front of the projection plane is illustrated in FIG. 28. As a comparison between FIGS. 27 and 28 clearly demonstrates, the accuracy of corresponding point detection does not greatly change between the two. In other words, by applying the present technology as described above, even if the imaging unit 312 is disposed with an ultra short focal point, corresponding point detection accuracy that is substantially the same as the case of disposing the imaging unit 312 with a long focal point can be obtained. In other words, by applying the present technology, a reduction in the accuracy of corresponding point detection can be suppressed.

<Projection Imaging Device>

Figure 29:
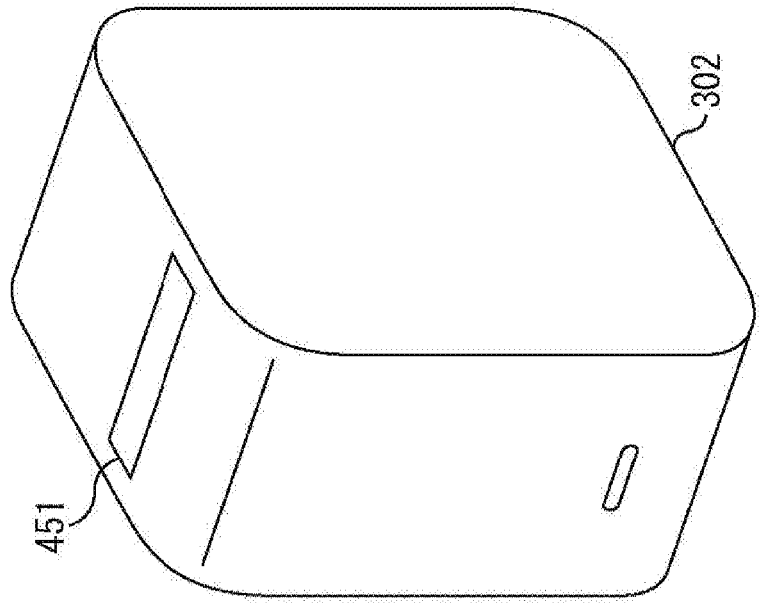
FIG. 29 is a diagram illustrating an example of a housing of the projection imaging device.

Note that in FIG. 19, the projection unit 311 and the imaging unit 312 are described as being provided at mutually different positions in the housing of the projection imaging device 302, but the configuration is not limited thereto, and the projection unit 311 and the imaging unit 312 may also be disposed coaxially. In the case of the example in FIG. 29, a projection imaging unit 451 is provided in the housing of the projection imaging device 302. The projection imaging unit 451 includes the projection unit 311 and the imaging unit 312 disposed coaxially with the optical system of the projection unit 311.

By taking such a configuration, it is not necessary to add an extra optical system, and the housing of the projection imaging device 302 can be made more compact than the case of FIG. 19. Also, because using the housings of a plurality of projection imaging devices 302 means that a baseline exists between optical systems with respect to each other, distortion of the projected image can be corrected.

Note that in the housing of the projection imaging device 302, the position, attitude, angle of view, and the like of the projection unit 311 and the imaging unit 312 may also be variable. However, to make it possible to achieve the system nomography transformation easily, it is preferable that the above is known information or to provide a measuring function capable of ascertaining the above information easily.

<Pattern Image>

Note that although the above describes using the pattern image 100 as illustrated in FIGS. 8 and 9, the pattern image may be any image and is not limited to these examples. For example, the shape, size, position, lengthwise direction, direction of brightness change, and the like of the pattern all may be set in any way. Also, any number of pattern images may be used for corresponding point detection. Corresponding points may be detected from a single pattern image, or corresponding points may be detected by using three or more pattern images. In addition, for example, the pattern image to use may be adaptively selected according to the content image or the like from among a plurality of candidates including pattern images of mutually different types. Alternatively, an existing pattern image may be adaptively modified according to the content image or the like. Furthermore, a new pattern image may be adaptively generated according to the content image or the like.

<Corresponding Point Detection Method>

Also, although the above describes using the ISL method, the corresponding point detection method may be any method insofar as the method involves the use of a pattern image, and is not limited to the ISL method. Consequently, the homography transformation can be applied to a captured image containing a pattern, in other words, the captured pattern image. Note that although the above describes applying the homography transformation to the pattern difference image, the pattern difference image is an image obtained using a captured pattern image, and is one example of a captured pattern image.

In addition, the pattern image does not have to be superimposed onto a content image. In other words, the captured pattern image may also be obtained by capturing an image of a projected image projected without superimposing the pattern image onto the content image. Namely, the captured pattern image in this case contains the pattern image but does not contain the content image. The homography transformation can be applied similarly to the case described earlier, even to such a captured pattern image.

3. Second Embodiment

<Other exemplary configurations of projection imaging system and projection imaging device>

Figure 30A:
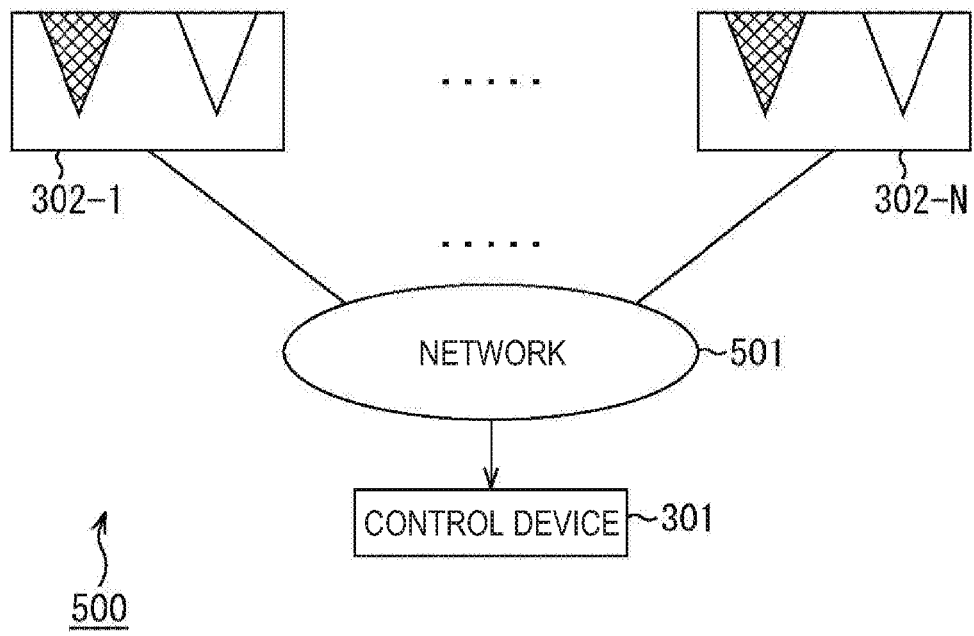
FIGS. 30A and 30B are block diagrams illustrating another exemplary configuration of the projection imaging system.

Note that an exemplary configuration of the projection imaging system to which the present technology is applied is not limited to the example described above. For example, like a projection imaging system 500 illustrated in FIG. 30A, the control device 301 and each of the projection imaging devices 302 may also be interconnected through a network 501.

The network 501 is any communication network. Any communication method may be adopted in the network 501. For example, the communication may be wired communication, wireless communication, or both. Also, the network 501 may be configured by a single communication network or by a plurality of communication networks. For example, communication networks and communication channels according to any communication standards may be included in the network 501, such as the Internet, the public telephone network, a wide-area communication network for wireless mobile stations such as what is called the 3G network or the 4G network, a wide area network (WAN), a local area network (LAN), a wireless communication network that performs communication conforming to the Bluetooth (registered trademark) standard, a communication channel for short-range wireless communication such as near field communication (NFC), a communication channel for infrared communication, or a communication network for wired communication conforming to a standard such as High-Definition Multimedia Interface (HDMI (registered trademark)) or Universal Serial Bus (USB).

The control device 301 and each of the projection imaging devices 302 are communicably connected to the network 501. Note that this connection may be wired (that is, a connection by wired communication), wireless (that is, a connection by wireless communication), or both. Note that the number of each of the devices, the shape and size of the housing, the disposed position, and the like may be set in any way.

The control device 301 and each of the projection imaging devices 302 can communicate with each other (exchange information and the like) through the network 501. In other words, the control device 301 and each of the projection imaging devices 302 may also be communicably connected to each other through other equipment (devices, transmission channels, or the like).

Even in the case of the projection imaging system 500 having such a configuration, the present technology can be applied similarly to the case of the projection imaging system 300 described in the first embodiment, and the effects described earlier can be exhibited.

Figure 30B:
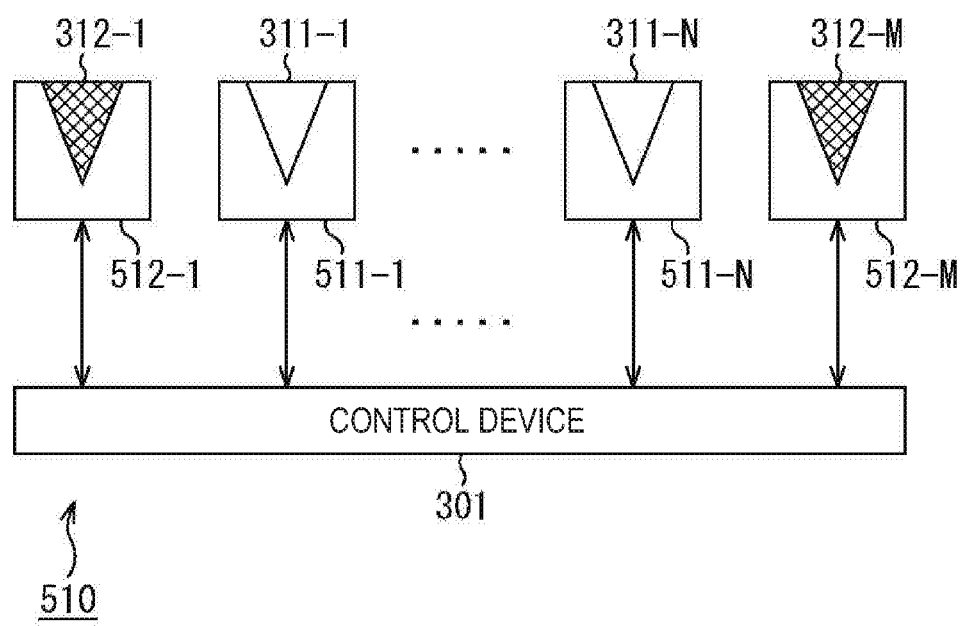

Additionally, the projection unit 311 and the imaging unit 312 may also be configured as different devices from each other, like in a projection imaging system 510 illustrated in FIG. 30B for example. Instead of the projection imaging devices 302, the projection imaging system 510 includes projection devices 511-1 to 511-N (where N is any natural number) as well as imaging devices 512-1 to 512-M (where M is any natural number). The projection devices 511-1 to 511-N respectively include the projection unit 311 (projection units 311-1 to 311-N), and each projects an image. The imaging devices 512-1 to 512-M respectively include the imaging unit 312 (imaging units 312-1 to 312-M), and each captures an image of the projection plane (a projected image projected by the projection unit 311).

The projection devices 511-1 to 511-N will be referred to as the projection device(s) 511 in a case where it is not necessary to distinguish among them in the description. The imaging devices 512-1 to 512-M will be referred to as the imaging device(s) 512 in a case where it is not necessary to distinguish among them in the description.

Each of the projection devices 511 and each of the imaging devices 512 are respectively communicably connected to the control device 301, and can communication (exchange information) with the control device 301 by wired communication, wireless communication, or both. Note that each of the projection devices 511 and each of the imaging devices 512 may also be configured to communicate with the other projection devices 511, the other imaging devices 512, or both through the control device 301.

Also, the number of each device, the shape and size of the housing, the disposed position, and the like may be set in any way. Also, like the example in FIG. 30A, each device may also be communicably connected to each other through other equipment (devices or transmission channels) like the network 501 or the like.

Even in the case of the projection imaging system 510 having such a configuration, the present technology can be applied similarly to the case of the projection imaging system 300 described in the first embodiment, and the effects described earlier can be exhibited.

Figure 31A:
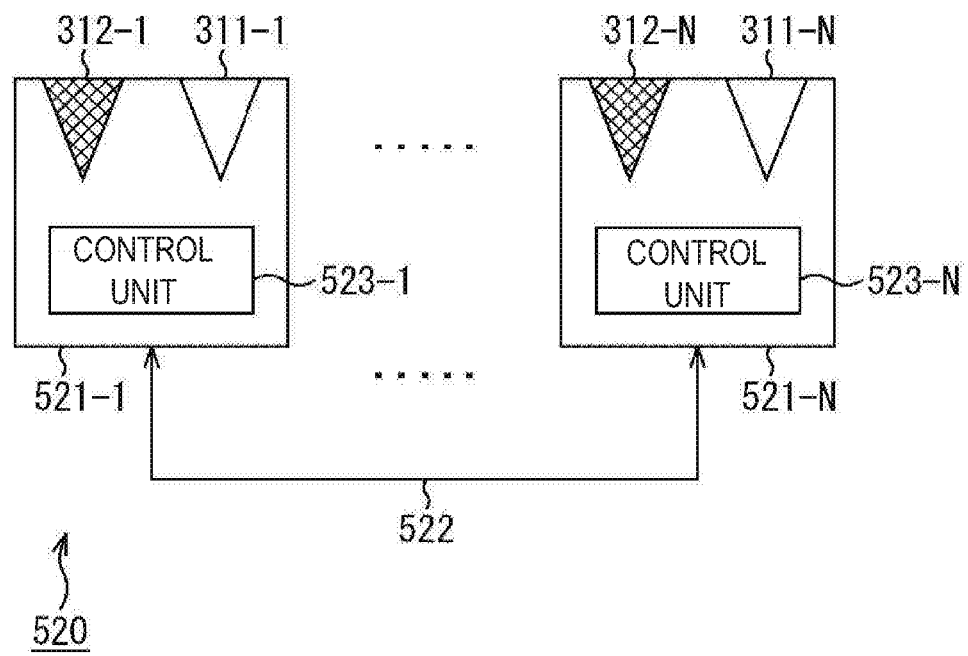
FIGS. 31A and 31B are block diagrams illustrating an exemplary principal configuration of the projection imaging system and the projection imaging device.

Additionally, the control device 301 may also be omitted, like in a projection imaging system 520 illustrated in FIG. 31A for example. As illustrated in FIG. 31A, the projection imaging system 520 includes projection imaging devices 521-1 to 521-N (where N is any natural number). The projection imaging devices 521-1 to 521-N will be referred to as the projection imaging device(s) 521 in a case where it is not necessary to distinguish among them in the description. Each of the projection imaging devices 521 may be communicably connected to each other through a communication cable 522, and furthermore, each of the projection imaging devices 521 may be communicably connected to each other by wireless communication.

The projection imaging devices 521-1 to 521-N include control units 523-1 to 523-N, respectively. The control units 523-1 to 523-N will be referred to as the control unit(s) 523 in a case where it is not necessary to distinguish among them in the description. The control unit 523 has functions similar to the control device 301, and is capable of performing similar processes.

In other words, in the case of the projection imaging system 520, the processes performed in the control device 301 described above are executed in (the control units 523 of) the projection imaging devices 521. Note that (the control unit 523 of) any projection imaging device 521 may be configured to execute all of the processes performed in the control device 301, or (the control units 523 of) a plurality of the projection imaging devices 521 may be configured to execute process cooperatively by exchanging information with each other and the like.

Even in the case of the projection imaging system 520 having such a configuration, the present technology can be applied similarly to the case of the projection imaging system 300 described in the first embodiment, and the effects described earlier can be exhibited.

Figure 31B:
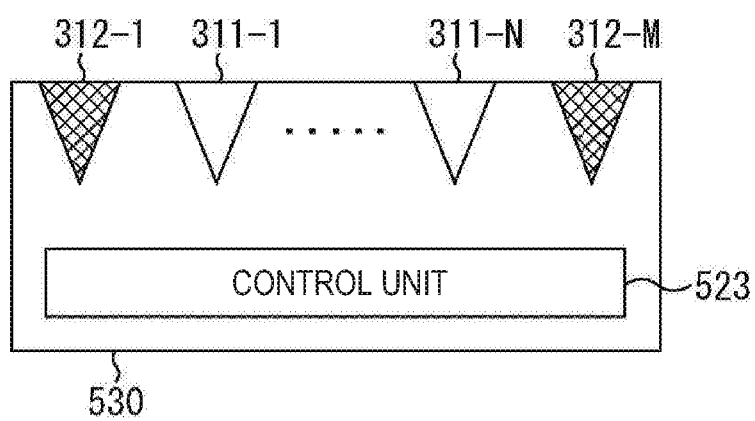

Additionally, the projection imaging system 300 may also be configured as a single device, as illustrated in FIG. 31B for example. The projection imaging device 530 illustrated in FIG. 31B includes projection units 311 (projection units 311-1 to 311-N (where N is any natural number)), imaging units 312 (imaging units 312-1 to 312-M (where M is any natural number)), and a control unit 523.

In the projection imaging device 530, by executing the processes performed in the control device 301 described above, the control unit 523 controls each projection unit 311 and each imaging unit 312 to detect corresponding points and the like.

Consequently, even in the case of the projection imaging device 530 having such a configuration, the present technology can be applied similarly to the case of the projection imaging system 300 described in the first embodiment, and the effects described earlier can be exhibited.

4. Other

<Software>

The series of processes described above can be executed by hardware, and can also be executed by software. Also, some processes can be executed by hardware while other processes can be executed by software. In the case of executing the series of processes described above by software, a program, data, and the like forming the software are installed from a network or a recording medium.

For example, in the case of the control device 301 in FIG. 15, the recording medium is configured separately from the body of the device as the removable medium 341 on which the program, data, and the like are recorded and which is distributed to deliver the program, data, and the like to users. In this case, for example, by loading the removable medium 341 into the drive 335, the program, data, and the like stored in the removable medium 341 can be read out and installed in the storage unit 333.

As another example, in the case of the projection imaging device 302 in FIG. 20, the recording medium is configured separately from the body of the device as the removable medium 421 on which the program, data, and the like are recorded and which is distributed to deliver the program, data, and the like to users. In this case, for example, by loading the removable medium 421 into the drive 415, the program, data, and the like stored in the removable medium 421 can be read out and installed in the storage unit 413.

In addition, the program, data, and the like can also be provided via a wired or wireless transmission medium such as a local area network, the Internet, or digital satellite broadcasting. For example, in the case of the control device 301 in FIG. 15, the program, data, and the like can be received by the communication unit 334 and installed in the storage unit 333. Further, as another example, in the case of the projection imaging device 302 in FIG. 20, the program, data, and the like can be received by the communication unit 414 and installed in the storage unit 413.

Otherwise, the program, data, and the like can also be preinstalled in a storage unit, ROM, or the like. For example, in the case of the control device 301 in FIG. 15, the program, and data, and the like can also be preinstalled in the storage unit 333, the ROM 322, or the like. Further, as another example, in the case of the projection imaging device 302 in FIG. 20, the program, data, and the like can also be preinstalled in the storage unit 413, ROM (not illustrated) built into the control unit 401, or the like.

<Supplement>

An embodiment of the present technology is not limited to the embodiments described above, and various changes can be made without departing from the scope of the present technology.

For example, the present technology can also be implemented by any of configurations constituting an apparatus or a system, for example, a processor as a system large scale integration (LSI) and the like, a module using a plurality of processors and the like, a unit using a plurality of modules and the like, a set in which other functions are further added to a set, or the like (i.e., a partial configuration of an apparatus).

Note that, in this specification, a system means a set of a plurality of constituent elements (e.g., devices or modules (parts)), regardless of whether or not all the constituent elements are in the same housing. Accordingly, a plurality of devices that is contained in different housings and connected via a network and one device in which a plurality of modules is contained in one housing are both systems.

Also, each of the processing units described above may be realized by any configuration insofar as the configuration has the functions described with regard to that processing unit. For example, the processing units may be configured using any type of circuit, LSI, system LSI, processor, module, unit, set, device, apparatus, system, or the like. Furthermore, the above may also be plurally combined. For example, configurations of the same type may be combined, such as a plurality of circuits or a plurality of processors, or configurations of different types may be combined, such as a circuit and an LSI.

Further, for example, an element described as a single device (or processing unit) may be divided and configured as a plurality of devices (or processing units). Conversely, elements described as a plurality of devices (or processing units) above may be configured collectively as a single device (or processing unit). Further, an element other than those described above may be added to the configuration of each device (or each processing unit). Furthermore, a part of the configuration of a given device (or processing unit) may be included in the configuration of another device (or another processing unit) as long as the configuration or operation of the system as a whole is substantially the same.

In addition, for example, the present technology can adopt a configuration of cloud computing which performs processing by allocating and sharing one function by a plurality of devices through a network.

In addition, for example, the program described above can be executed in any device. In this case, it is sufficient if the device has a necessary function (functional block or the like) and can obtain necessary information.

In addition, for example, each step described by the above-described flowcharts can be executed by one device or executed by being allocated to a plurality of devices. Furthermore, in a case where a plurality of processes is included in one step, the plurality of processes included in this one step can be executed by one device or executed by being allocated to a plurality of devices. In other words, a plurality of processes included in one step can also be executed as a process of a plurality of steps. Conversely, a process described as a plurality of steps can be collectively executed in one step.

In a program executed by a computer, processing in steps describing the program may be executed chronologically along the order described in this specification, or may be executed concurrently, or individually at necessary timing such as when a call is made. In other words, unless a contradiction arises, processing in the steps may be executed in an order different from the order described above. Furthermore, processing in steps describing the program may be executed concurrently with processing of another program, or may be executed in combination with processing of another program.

The plurality of present technologies described in this specification can be performed alone independently of each other, unless a contradiction arises. Of course, any plurality of the present technologies can be performed in combination. In one example, a part or all of the present technology described in any of the embodiments can be performed in combination with a part or all of the present technology described in another embodiment. In addition, any of a part or all of the present technologies described above can be performed in combination with another technology that is not described above.

Additionally, the present technology may also be configured as below.

(1)

An image processing device including:

a corresponding point detection unit that applies a homography transformation to a captured pattern image obtained as a result of an imaging unit capturing an image of a predetermined structured light pattern projected by a projection unit, and uses the captured pattern image with the homography transformation applied to detect corresponding points between the projected image projected by the projection unit and the captured image captured by the imaging unit.

(2)

The image processing device according to (1), in which the corresponding point detection unit applies the homography transformation on the basis of design values of the projection unit and the imaging unit to thereby convert the captured pattern image to a coordinate system as seen from a front, and detects the corresponding points using the captured pattern image converted to the coordinate system as seen from the front.

(3)

The image processing device according to (2), in which the corresponding point detection unit converts coordinates of four corners of a projected image projected by the projection unit to a coordinate system of the imaging unit on the basis of the design values, and utilizes the converted coordinates of the four corners to apply the homography transformation to the captured pattern image.

(4)

The image processing device according to (2) or (3), in which the corresponding point detection unit applies an inverse homography transformation that is an inverse transformation of the homography transformation to the detected corresponding points.

(5)

The image processing device according to (1), in which the corresponding point detection unit applies the homography transformation on the basis of design values of the projection unit and the imaging unit to thereby convert the captured pattern image to a coordinate system as seen from a front, and detects provisional corresponding points using the captured pattern image converted to the coordinate system as seen from the front, and additionally applies the homography transformation on the basis of the detected provisional corresponding points to thereby convert the captured pattern image converted to the coordinate system as seen from the front to a coordinate system of a projected image projected by the projection unit, and detects the corresponding points using the captured pattern image converted to the coordinate system of the projected image.

(6)

The image processing device according to (5), in which the corresponding point detection unit applies an inverse homography transformation that is an inverse transformation of the homography transformation to the detected corresponding points.

(7)

The image processing device according to any one of (1) to (6), in which the captured pattern image is an image obtained using a captured image of the structured light pattern projected superimposed onto another image.

(8)

The image processing device according to (7), in which the captured pattern image is a difference image of respective captured images of two projected images containing the structured light pattern having a same shape as each other and also having mutually opposing directions of brightness change.

(9)

The image processing device according to (8), in which the captured pattern image is a difference image between composite images containing the structured light pattern having the mutually opposing directions of brightness change, each of the composite images being obtained by adding together respective captured images of a plurality of projected images containing the structured light pattern having a same direction of brightness change as each other.

(10)

The image processing device according to any one of (1) to (9), in which the structured light pattern contains two patterns of elliptical shapes having mutually opposing directions of brightness change.

(11)

The image processing device according to (10), in which the structured light pattern contains a plurality of patterns having different lengthwise directions of the elliptical shapes.

(12)

The image processing device according to any one of (1) to (11), further including:

the projection unit.

(13)

The image processing device according to (12), in which the projection unit is positioned closely to a projection plane.

(14)

The image processing device according to (12) or (13), in which the projection unit projects an identical structured light pattern a plurality of times.

(15)

The image processing device according to (12), in which the projection unit is plurally provided, and each projection unit successively projects the structured light pattern.

(16)

The image processing device according to any one of (1) to (15), further including:

the imaging unit.

(17)

The image processing device according to (16), in which the imaging unit is positioned closely to a projection plane.

(18)

The image processing device according to (16) or (17), in which the imaging unit captures a projected image of an identical structured light pattern a plurality of times.

(19)

The image processing device according to any one of (16) to (18), in which, the imaging unit is plurally provided, and each imaging unit captures an image of a projected image of an identical structured light pattern.

(20)

An image processing method including:

applying a homography transformation to a captured pattern image obtained as a result of an imaging unit capturing an image of a predetermined structured light pattern projected by a projection unit, and using the captured pattern image with the homography transformation applied to detect corresponding points between the projected image projected by the projection unit and the captured image captured by the imaging unit.

REFERENCE SIGNS LIST

100 Pattern image
101 Pattern
300 Projection imaging system
301 Control device
302 Projection imaging device
311 Projection unit
312 Imaging unit
351 Projection imaging processing unit
352 Corresponding point detection processing unit
353 Naturalization correction processing unit
361 Processing control unit
362 Projection control unit
363 Imaging control unit
371 Control unit
372 Noise reduction unit
373 Pattern difference image generation unit
374 System homography transformation unit
375 Corresponding point detection unit
376 Algo-homography transformation unit
377 Corresponding point detection unit
378 Inverse homography transformation unit
401 Control unit
500 Projection imaging system
501 Network
510 Projection imaging system
511 Projection device
512 Imaging device
520 Projection imaging system
521 Projection imaging device
523 Control unit
530 Projection imaging device

The invention claimed is:

1. An image processing device, comprising:
a projection imaging processing unit configured to:
control a projection unit to project a plurality of composite images including a first composite image and a second composite image, wherein
the first composite image includes a first specific structured light pattern superimposed on a first frame of a content image,
the second composite image includes a second specific structured light pattern superimposed on a second frame of the content image, a shape of the first specific structured light pattern is same as a shape of the second specific structured light pattern, and a direction of brightness change of the first specific structured light pattern is opposite to a direction of brightness change of the second specific structured light pattern; and control an imaging unit to capture the projected plurality of composite images including the projected first composite image and the projected second composite image; and a corresponding point detection unit configured to:
generate a captured pattern image based on a difference image of the captured first composite image and the captured second composite image;

apply a first homography transformation to the captured pattern image; and detect first corresponding points between the projected first composite image of the projected plurality of composite images and the captured second composite image of the captured plurality of composite images, based on the captured pattern image with the applied first homography transformation.

2. The image processing device according to claim 1, wherein the corresponding point detection unit is further configured to:

apply the first homography transformation based on design values of the projection unit and the imaging unit;

convert, based on the application of the first homography transformation, the captured pattern image to a first coordinate system as seen from a front of the projected plurality of composite images; and detect the first corresponding points based on the captured pattern image converted to the first coordinate system.

3. The image processing device according to claim 2, wherein the corresponding point detection unit is further configured to:

convert coordinates of four corners of the projected first composite image projected to a second coordinate system of the imaging unit based on the design values;

compute a homography matrix based on the converted coordinates of the four corners; and apply the first homography transformation to the captured pattern image based on the computed homography matrix.

4. The image processing device according to claim 2, wherein
the corresponding point detection unit is further configured to apply an inverse homography transformation to the detected first corresponding points, and
the inverse homography transformation is an inverse transformation of the first homography transformation.

5. The image processing device according to claim 1, wherein the corresponding point detection unit is further configured to:

apply the first homography transformation based on design values of the projection unit and the imaging unit;

convert, based on the application of the first homography transformation, the captured pattern image to a first coordinate system as seen from a front of the projected plurality of composite images;

detect the first corresponding points based on the captured pattern image converted to the first coordinate system;

apply a second homography transformation on the captured pattern image, wherein the second homography transformation is based on the detected first corresponding points;

convert, based on the application of the second homography transformation, the captured pattern image converted to the first coordinate system to a second coordinate system of the projected image first composite; and detect second corresponding points based on the captured pattern image converted to the second coordinate system.

6. The image processing device according to claim 5, wherein
the corresponding point detection unit is further configured to apply an inverse homography transformation to the detected second corresponding points, and
the inverse homography transformation is an inverse transformation of the second homography transformation.

7. The image processing device according to claim 1, wherein the corresponding point detection unit is further configured to add together at least two composite images of the captured plurality of composite images, and
the at least two composite images of the captured plurality of composite images include at least two structured light patterns having same direction of brightness change.

8. The image processing device according to claim 1, wherein
each of the first specific structured light pattern and the second specific structured light pattern contains two patterns of elliptical shapes having mutually opposite directions of brightness change.

9. The image processing device according to claim 8, wherein
each of the first specific structured light pattern and the second specific structured light pattern further contains a plurality of patterns having different lengthwise directions of the elliptical shapes.

10. The image processing device according to claim 1, further comprising the projection unit.

11. The image processing device according to claim 10, wherein the projection unit is at a specific proximity to a projection plane.

12. The image processing device according to claim 10, wherein the projection unit is configured to project an identical structured light pattern a plurality of times.

13. The image processing device according to claim 10, wherein
the projection unit includes a plurality of projection units, and
each of the plurality of projection units is configured to successively project the first specific structured light pattern and the second specific structured light pattern.

14. The image processing device according to claim 1, further comprising the imaging unit.

15. The image processing device according to claim 14, wherein the imaging unit is at a specific proximity to a projection plane.

16. The image processing device according to claim 14, wherein
the imaging unit is configured to capture an identical structured light pattern a plurality of times.

17. The image processing device according to claim 14, wherein the imaging unit includes a plurality of imaging units, and
each of the plurality of imaging units is configured to capture an image of a projected image of an identical structured light pattern.

18. An image processing method, comprising:
controlling a projection unit to project a plurality of composite images including a first composite image and a second composite image, wherein
the first composite image includes a first specific structured light pattern superimposed on a first frame of a content image,
the second composite image includes a second specific structured light pattern superimposed on a second frame of the content image,
a shape of the first specific structured light pattern is same as a shape of the second specific structured light pattern, and
a direction of brightness change of the first specific structured light pattern is opposite to a direction of brightness change of the second specific structured light pattern;
controlling an imaging unit to capture the projected plurality of composite images including the projected first composite image and the projected second composite image;
generating a captured pattern image based on a difference image of the captured first composite image and the captured second composite image;
applying a homography transformation to the captured pattern image; and
detecting corresponding points between the first projected first composite image of the projected plurality of composite images and the captured second composite image of the captured plurality of composite images, based on the captured pattern image with the applied homography transformation.

19. An image processing device, comprising:
a projection imaging processing unit configured to:
control a projection unit to project an image including a structured light pattern, wherein the structured light pattern includes two patterns of elliptical shapes having mutually opposite directions of brightness change; and
control an imaging unit to capture the projected image including the structured light pattern; and
a corresponding point detection unit configured to:
generate a captured pattern image based on the structured light pattern of the captured image;
apply a homography transformation to the captured pattern image; and
detect corresponding points between the projected image and the captured image based on the captured pattern image with the applied homography transformation.

* * * * *